United States Patent
Tsuboi et al.

(10) Patent No.: US 12,041,684 B2
(45) Date of Patent: Jul. 16, 2024

(54) TERMINAL APPARATUS, METHOD, AND INTEGRATED CIRCUIT

(71) Applicant: SHARP KABUSHIKI KAISHA, Sakai (JP)

(72) Inventors: Hidekazu Tsuboi, Sakai (JP); Shohei Yamada, Sakai (JP); Takako Hori, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 344 days.

(21) Appl. No.: 17/442,546

(22) PCT Filed: Mar. 16, 2020

(86) PCT No.: PCT/JP2020/011494
§ 371 (c)(1),
(2) Date: Sep. 23, 2021

(87) PCT Pub. No.: WO2020/196039
PCT Pub. Date: Oct. 1, 2020

(65) Prior Publication Data
US 2022/0191968 A1 Jun. 16, 2022

(30) Foreign Application Priority Data
Mar. 28, 2019 (JP) .................... 2019-063116

(51) Int. Cl.
*H04W 76/38* (2018.01)
*H04W 56/00* (2009.01)
(Continued)

(52) U.S. Cl.
CPC ......... *H04W 76/38* (2018.02); *H04W 56/001* (2013.01); *H04W 76/20* (2018.02); *H04W 80/02* (2013.01)

(58) Field of Classification Search
CPC ..... H04W 76/38; H04W 76/20; H04W 76/18; H04W 76/19; H04W 56/001; H04W 80/02; H04W 36/0079; H04W 36/305
(Continued)

(56) References Cited

U.S. PATENT DOCUMENTS

2014/0321267 A1* 10/2014 Jiang ................. H04L 45/28
370/225
2016/0227459 A1* 8/2016 Fujishiro .......... H04W 36/0069
(Continued)

FOREIGN PATENT DOCUMENTS

| EP | 3714630 A1 | 9/2020 |
|---|---|---|
| EP | 3863327 A1 | 8/2021 |

(Continued)

OTHER PUBLICATIONS

NTT DOCOMO, Inc., "New WID on New Radio Access Technology", RP-170855, 3GPP TSG RAN Meeting #75, Dubrovnik, Croatia, Mar. 6-9, 2017.
(Continued)

*Primary Examiner* — Candal Elpenord
(74) *Attorney, Agent, or Firm* — ScienBiziP, P.C.

(57) ABSTRACT

A terminal apparatus includes: a receiver that receives an RRC message from a base station apparatus; and a processing unit that performs processing of RRC. The processing unit causes, when first information is in the RRC message, a first timer to start in a running state, and considers, at least when a random access problem indication is received from a MAC entity of the group and the first timer is not running, or when a random access problem indication is received from a MAC entity of the group and the first timer is running under a specific condition, a radio link failure for the group to be detected. When the radio link failure for the group is detected and that the first timer is running under the specific
(Continued)

condition, the processing unit suspends transmission of all radio bearers in the group, and resets the MAC entity of the group.

4 Claims, 13 Drawing Sheets

(51) Int. Cl.
*H04W 76/20* (2018.01)
*H04W 80/02* (2009.01)
(58) Field of Classification Search
USPC .................................................. 370/329–330
See application file for complete search history.

(56) References Cited

U.S. PATENT DOCUMENTS

| 2018/0070327 | A1* | 3/2018 | Qureshi | ............ | H04W 56/0055 |
| 2019/0289510 | A1* | 9/2019 | Rugeland | ............ | H04W 36/302 |
| 2021/0160136 | A1* | 5/2021 | Bao | ...................... | H04L 43/0811 |
| 2022/0046487 | A1* | 2/2022 | Yiu | .................... | H04W 36/0027 |

FOREIGN PATENT DOCUMENTS

| WO | 2018/167358 A1 | 9/2018 |
| WO | 2018/182231 A1 | 10/2018 |
| WO | 2020/101899 A1 | 5/2020 |
| WO | 2020/162704 A1 | 8/2020 |

OTHER PUBLICATIONS

"3rd Generation Partnership Project; Technical Specification Group Services and System Aspects; System Architecture for the 5G System; Stage 2(Release 15)", 3GPP TS 23.501 V15.3.0 (Sep. 2018).
"3rd Generation Partnership Project; Technical Specification Group Radio Access Network; Evolved Universal Terrestrial Radio Access (E-UTRA) and Evolved Universal Terrestrial Radio Access Network(E-UTRAN); Overall description; Stage 2(Release 15)", 3GPP TS 36.300 V15.3.0 (Sep. 2018).
"3rd Generation Partnership Project; Technical Specification Group Radio Access Network; Evolved Universal Terrestrial Radio Access (E-UTRA); Radio Resource Control (RRC); Protocol specification(Release 15)", 3GPP TS 36.331 V15.4.0 (Dec. 2018).
"3rd Generation Partnership Project; Technical Specification Group Radio Access Network; Evolved Universal Terrestrial Radio Access (E-UTRA); Packet Data Convergence Protocol (PDCP) specification(Release 15)", 3GPP TS 36.323 V15.3.0 (Mar. 2019).
"3rd Generation Partnership Project; Technical Specification Group Radio Access Network; Evolved Universal Terrestrial Radio Access (E-UTRA); Radio Link Control (RLC) protocol specification(Release 15)", 3GPP TS 36.322 V15.3.0 (Sep. 2019).
"3rd Generation Partnership Project; Technical Specification Group Radio Access Network; Evolved Universal Terrestrial Radio Access (E-UTRA); Medium Access Control (MAC) protocol specification(Release 15)", 3GPP TS 36.321 V15.3.0 (Sep. 2018).
"3rd Generation Partnership Project; Technical Specification Group Radio Access Network; Evolved Universal Terrestrial Radio Access (E-UTRA) and NR; Multi-connectivity; Stage 2(Release 15)", 3GPP TS 37.340 V15.3.0 (Sep. 2018).
"3rd Generation Partnership Project; Technical Specification Group Radio Access Network; NR; NR and NG-RAN Overall Description; Stage 2(Release 15)", 3GPP TS 38.300 V15.3.0 (Sep. 2018).
"3rd Generation Partnership Project; Technical Specification Group Radio Access Network; NR; Radio Resource Control (RRC) protocol specification(Release 15)", 3GPP TS 38.331 V15.4.0 (Dec. 2018).
"3rd Generation Partnership Project; Technical Specification Group Radio Access Network; NR; Packet Data Convergence Protocol (PDCP) specification(Release 15)", 3GPP TS 38.323 V15.3.0 (Sep. 2018).
"3rd Generation Partnership Project; Technical Specification Group Radio Access Network; NR; Radio Link Control (RLC) protocol specification(Release 15)", 3GPP TS 38.322 V15.3.0 (Sep. 2018).
"3rd Generation Partnership Project; Technical Specification Group Radio Access Network; NR; Medium Access Control (MAC) protocol specification(Release 15)", 3GPP TS 38.321 V15.3.0 (Sep. 2018).
"3rd Generation Partnership Project; Technical Specification Group Services and System Aspects; General Packet Radio Service (GPRS) enhancements for Evolved Universal Terrestrial Radio Access Network(E-UTRAN) access (Release 15)", 3GPP TS 23.401 V15.0.0 (Jun. 2017).
"3rd Generation Partnership Project; Technical Specification Group Services and System Aspects; Procedures for the 5G System; Stage 2(Release 15)", 3GPP TS 23.502 V15.3.0 (Sep. 2018).
"3rd Generation Partnership Project; Technical Specification Group Radio Access Network; E-UTRA and NR; Service Data Adaptation Protocol (SDAP) specification(Release 15)", 3GPP TS 37.324 V15.1.0 (Sep. 2018).
ETSI MCC, "Report of 3GPP TSG RAN2#105 meeting, Athens, Greece", R2-1903001, Feb. 25-Mar. 1, 2019.
China Telecom, "Revised WID: Even further mobility enhancement in E-UTRAN", RP-181544, 3GPP TSG RAN meeting #81, Gold Coast, Australia, Sep. 10-13, 2018.
Intel Corporation, "New WID: NR mobility enhancements", RP-181433, 3GPP TSG RAN Meeting #80, La Jolla, USA, May 21-May 25, 2018.
Intel Corporation, "Detail for non-split bearer option for simultaneous connectivity", R2-1901364, 3GPP TSG RAN WG2 Meeting #105, Athens, Greece, Feb. 25-Mar. 1, 2019.
Nokia et al., "S-RLF with Tight Interworking", R2-1702631, 3GPP TSG-RAN WG2 Meeting #97bis, Spokane, USA, Apr. 3-7, 2017.
NTT DOCOMO, Inc., "Status Report to TSG: Dual Connectivity for LTE", RP-141796, 3GPP TSG RAN meeting #66, Maui, USA, Dec. 8-11, 2014.

\* cited by examiner

| Timer | Start | Stop | At expiry |
|---|---|---|---|
| T300 | Transmission of RRCConnectionRequest or RRCConnectionResumeRequest or RRCEarlyDataRequest | Reception of RRCConnectionSetup, RRCConnectionReject or RRCConnectionResume or RRCEarlyDataComplete or RRCConnectionRelease for UP-EDT, cell re-selection and upon abortion of connection establishment by upper layers | Perform the specified action |
| T301 | Transmission of RRCConnectionReestablishmentRequest | Reception of RRCConnectionReestablishment or RRCConnectionReestablishmentReject message as well as when the selected cell becomes unsuitable | Go to RRC_IDLE |
| T304 | Reception of RRCConnectionReconfiguration message including the MobilityControl Info or reception of MobilityFromEUTRACommand message including CellChangeOrder | Criterion for successful completion of handover within E-UTRA, handover to E-UTRA or cell change order is met (the criterion is specified in the target RAT in case of inter-RAT) | In case of cell change order from E-UTRA or intra E-UTRA handover, initiate the RRC connection re-establishment procedure; In case of handover to E-UTRA, perform the actions defined in the specifications applicable for the source RAT. |
| T311 | Upon initiating the RRC connection re-establishment procedure | Selection of a suitable E-UTRA cell or a cell using another RAT. | Enter RRC_IDLE |

FIG. 9

```
<OMITTED>
MobilityControlInfo ::=     SEQUENCE {
targetPhysCellId            PhysCellId,
<PARTLY OMITTED>
t304                        ENUMERATED {
                              ms50, ms100, ms150, ms200, ms500, ms1000,
                              ms2000, ms10000-v1310},
newUE-Identity              C-RNTI,
radioResourceConfigCommon   RadioResourceConfigCommon,
rach-ConfigDedicated        RACH-ConfigDedicated   OPTIONAL,   -- Need OP
...,
<PARTLY OMITTED>
[[
<PARTLY OMITTED>
    makeBeforeBreak-r14     ENUMERATED {true}      OPTIONAL,   -- Need OR
    rach-Skip-r14           RACH-Skip-r14          OPTIONAL,   -- Need OR
<PARTLY OMITTED>
]],
<PARTLY OMITTED>
[[
<PARTLY OMITTED>
    makeBeforeBreak-r16     ENUMERATED {true}      OPTIONAL,   -- Need OR
<PARTLY OMITTED>
]],
<PARTLY OMITTED>
<OMITTED>
}
```

FIG. 10

```
<OMITTED>
MobilityControlInfo ::=    SEQUENCE {
    <PARTLY OMITTED>
    [[
    <PARTLY OMITTED>
        makeBeforeBreak-r14         ENUMERATED {true}        OPTIONAL,  -- Need OR
    <PARTLY OMITTED>
    ]],
    <PARTLY OMITTED>
        makeBeforeBreak-r16         MakeBeforeBreak-r16      OPTIONAL,  -- Need OR
    <PARTLY OMITTED>
    ]],
    ...
<OMITTED>
MakeBeforeBreak-r16 ::=    SEQUENCE {
    parameterA               ParameterA,
    parameterB               ParameterB,
    <PARTLY OMITTED>
},
<OMITTED>
```

FIG. 11

```
<OMITTED>
ReconfigurationWithSync ::=    SEQUENCE {
    spCellConfigCommon      ServingCellConfigCommon      OPTIONAL,    -- Need M
    <PARTLY OMITTED>
    t304                    ENUMERATED {ms50, ms100, ms150, ms200, ms500, ms1000, ms2000, ms10000},
    newUE-Identity          RNTI-Value,
    rach-ConfigDedicated    CHOICE {
        uplink                          RACH-ConfigDedicated,
        supplementaryUplink             RACH-ConfigDedicated
                                                         OPTIONAL,    -- Need N
    }
    <PARTLY OMITTED>
    [[
    <PARTLY OMITTED>
    makeBeforeBreak-r16     ENUMERATED {true}            OPTIONAL,    -- Need OR
    rach-Skip-r16           RACH-Skip-r16                OPTIONAL,    -- Need OR
    <PARTLY OMITTED>
    ]],
    <PARTLY OMITTED>
<OMITTED>
}
```

FIG. 12

```
<OMITTED>
ReconfigurationWithSync ::=   SEQUENCE {
<PARTLY OMITTED>
[[
<PARTLY OMITTED>
    makeBeforeBreak-r16      MakeBeforeBreak-r16     OPTIONAL,  -- Need OR
<PARTLY OMITTED>
]],
<PARTLY OMITTED>
    <OMITTED>
}

MakeBeforeBreak-r16 ::=   SEQUENCE {
    parameterA       ParameterA,
    parameterB       ParameterB,
<PARTLY OMITTED>
    <OMITTED>
}
```

FIG. 13

TERMINAL APPARATUS, METHOD, AND INTEGRATED CIRCUIT

TECHNICAL FIELD

The present invention relates to a terminal apparatus, a method, and an integrated circuit. This application claims priority based on JP 2019-063116 filed on Mar. 28, 2019, the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (E-UTRA)") and a core network (which will be referred to as "Evolved Packet Core or EPC") have been studied by the 3rd Generation Partnership Project (3GPP). EUTRA is also referred to as E-UTRA.

As a radio access method and a radio network technology for a 5th generation cellular system, technical studies and standardization of LTE-Advanced Pro, which is an enhanced technology of LTE, and New Radio technology (NR), which is a new radio access technology, have been conducted by the 3GPP (NPL 1). Furthermore, 5th Generation Core Network (5GC), which is a core network for the 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501 v15.3.0, "System Architecture for the 5G System; Stage 2"
NPL 3: 3GPP TS 36.300, v15.3.0, "Evolved Universal Terestrial Radio Access (E-UTRA) and Evolved Universal Terrestrial Radio Access Network (E-UTRAN); Overall description; Stage 2"
NPL 4: 3GPP TS 36.331 v15.4.0, "Evolved Universal Terestrial Radio Access (E-UTRA); Radio Resource Control (RRC); Protocol specifications"
NPL 5: 3GPP TS 36.323 v15.3.0, "Evolved Universal Terestrial Radio Access (E-UTRA); Packet Data Convergence Protocol (PDCP) specification"
NPL 6: 3GPP TS 36.322 v15.3.0, "Evolved Universal Terestrial Radio Access (E-UTRA); Radio Link Control (RLC) protocol specification"
NPL 7: 3GPP TS 36.321 v15.3.0, "Evolved Universal Terestrial Radio Access (E-UTRA); Medium Access Control (MAC) protocol specification"
NPL 8: 3GPP TS 37.340v 15.3.0, "Evolved Universal Terestrial Radio Access (E-UTRA) and NR; Multi-Connectivity; Stage 2"
NPL 9: 3GPP TS 38.300v 15.3.0, "NR; NR and NG-RAN Overall description; Stage 2"
NPL 10: 3GPP TS 38.331 v15.4.0. "NR; Radio Resource Control (RRC); Protocol specifications"
NPL 11: 3GPP TS 38.323 v 15.3.0, "NR; Packet Data Convergence Protocol (PDCP) specification"
NPL 12: 3GPP TS 38.322 v15.3.0, "NR; Radio Link Control (RLC) protocol specification"
NPL 13: 3GPP TS 38.321 v15.3.0, "NR; Medium Access Control (MAC) protocol specification"
NPL 14: 3GPP TS 23.401 v15.0.0, "General Packet Radio Service (GPRS) enhancements for Evolved Universal Terrestrial Radio Access Network (E-UTRAN) access"
NPL 15: 3GPP TS 23.502 v15.3.0, "Procedure for 5G System; Stage 2"
NPL 16: 3GPP TS 37.324 v15.1.0, "NR; Service Data Adaptation Protocol (SDAP) specification"
NPL 17: 3GPP Draft_Report_v1.doc, "Report of 3GPP TSG RAN2 #105 meeting, Athens, Greece" http://www.3gpp.org/ftp/TSG_RAN/WG2_RL2/TSGR2_105/Report/Draft_Report_v1.zip
NPL 18: 3GPP RP-181544, "Revised WID: Even further mobility enhancement in E-UTRAN"
NPL 19: 3GPP RP-181433, "New WID: NR mobility enhancements"
NPL 20: 3GPP R2-1901364, "Detail for non-split bearer option for simultaneous connectivity"

SUMMARY OF INVENTION

Technical Problem

As one of the technical studies of LTE, a system for further enhancing the existing mobility enhancement technology of LTE has been under study. Further, in the technical studies of NR as well, a system for enhancing the existing mobility technology of NR has been under study. (NPLs 18 and 19). These studies mainly include the study of a technology of bringing interruption of transmission and/or reception of user data close to 0 ms (Reduce User Data Interruption (RUDI)) and the study of improvement of robustness of handover (Handover robustness improvements) in a case of movement between cells while the base station apparatus and the terminal apparatus are connected (in a case of handover).

In the existing mobility technology, in a case of a failure of handover, a procedure of performing re-establishment of connection is performed. In NPL 20, by contrast, as enhancement thereof, a system of indicating the failure of handover to a handover source cell (source cell) is proposed. The following system is proposed as well: in a case that random access processing for a handover target cell (target cell) fails, and connection to a source cell is still possible in spite of the failure, connection returns (falls back) to the source cell, whereas in a case that connection to a source cell is not possible, a re-establishment procedure of connection is initiated.

However, there is a problem in that detection of a radio link failure as one way of determination as to whether connection to a source cell described above is possible cannot be performed during handover in the existing system.

An aspect of the present invention is made in view of the circumstances described above, and has an object to provide a terminal apparatus, a method, and an integrated circuit that can enable efficient control of mobility.

Solution to Problem (1) In order to accomplish the object described above, an aspect of the present invention is contrived to provide the following measures. Specifically, a first embodiment aspect of the present invention is a terminal apparatus for communicating with a base station apparatus through a group including at least one or more cells. The terminal apparatus includes: a receiver configured to receive an RRC message from the base station apparatus, and a processing unit configured to perform processing of RRC. The procesisng unit causes, in a case that first information is included in the RRC message, a first timer to start to be in a running state, considers, at least in a case that a random access problem indication is received from a MAC entity of the group in a state in which the first timer is not running, or in a case that a random access problem indication is received from a MAC entity of the group in a state in which the first timer is running under a specific condition, a radio link failure for the group to be detected. In a case that the radio link failure for the group is considered to be detected and that the first timer is running under the specific condition, the processing unit suspneds transmission of all of radio bearers in the group, and resets the MAC entity of the group.

(2) A second embodiment aspect of the present invention is a terminal apparatus for communicating with a base station apparatus through a group including at least one or more cells. The terminal apparatus includes: a receiver configured to receive an RRC message from the base station apparatus; and a processing unit configured to perform processing of RRC. The processing unit causes, in a case that first information is included in the RRC message, a first timer to start to be in a running state, causes, at least in a case that a first indication is consecutively received a predetermined number of times from a PHY entity of the group in a state in which the first timer is not running, or in a case that the first indication is consecutively received a predetermined number of times from a PHY entity of the group regardless of whether or not the first timer is running under a specific condition, a second timer to start to be in a running state, and considers, in a case that the second timer expires, a radio link failure for the group to be detected.

(3) A third embodiment aspect of the present invention is a method applied to a terminal apparatus for communicating with a base station apparatus through a group including at least one or more cells. The method at least includes the steps of: receiving an RRC message from the base station apparatus; and performing processing of RRC. In a case that first information is included in the RRC message, a first timer is caused to start to be in a running state. At least in a case that a random access problem indication is received from a MAC entity of the group in a state in which the first timer is not running, or in a case that a random access problem indication is received from a MAC entity of the group in a state in which the first timer is running under a specific condition, a radio link failure for the group is considered to be detected. In a case that the radio link failure for the group is considered to be detected and that the first timer is running under the specific condition, transmission of all of radio bearers in the group is suspended, and the MAC entity of the group is reset.

(4) A second embodiment aspect of the present invention is a method applied to a terminal apparatus for communicating with a base station apparatus through a group including at least one or more cells. The method includes the steps of: receiving an RRC message from the base station apparatus; and performing processing of RRC. In a case that first information is included in the RRC message, a first timer is caused to start to be in a running state. At least in a case that a first indication is consecutively received a predetermined number of times from a PHY entity of the group in a state in which the first timer is not running, or in a case that the first indication is consecutively received a predetermined number of times from a PHY entity of the group regardless of whether or not the first timer is running under a specific condition, a second timer is caused to start to be in a running state. In a case that the second timer expires, a radio link failure for the group is considered to be detected.

(5) A fifth embodiment aspect of the present invention is an integrated circuit implemented in a terminal apparatus for communicating with a base station apparatus through a group including at least one or more cells. The integrated circuit causes the terminal apparatus to perform: receiving an RRC message from the base station apparatus; and performing processing of RRC. In a case that first information is included in the RRC message, a first timer is caused to start to be in a running state. At least in a case that a random access problem indication is received from a MAC entity of the group in a state in which the first timer is not running, or in a case that a random access problem indication is received from a MAC entity of the group in a state in which the first timer is running under a specific condition, a radio link failure for the group is considered to be detected. In a case that the radio link failure for the group is considered to be detected and that the first timer is running under the specific condition, transmission of all of radio bearers in the group is suspended, and the MAC entity of the group is reset.

(6) A sixth embodiment aspect of the present invention is an integrated circuit implemented in a terminal apparatus for communicating with a base station apparatus through a group including at least one or more cells. The integrated circuit causes the terminal apparatus to perform: receiving an RRC message from the base station apparatus; and performing processing of RRC. In a case that first information is included in the RRC message, a first timer is caused to start to be in a running state. At least in a case that a first indication is consecutively received a predetermined number of times from a PHY entity of the group in a state in which the first timer is not running, or in a case that the first indication is consecutively received a predetermined number of times from a PHY entity of the group regardless of whether or not the first timer is running under a specific condition, a second timer is caused to start to be in a running state. In a case that the second timer expires, a radio link failure for the group is considered to be detected.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, a terminal apparatus can implement efficient mobility processing.

BRIEF DESCRIPTION OF DRAWINGS

FIG. 9 is an example of conditions of start and stop of each timer according to the embodiment of the present invention.

FIG. 10 is an example of a mobilityControlInfo information element according to the embodiment of the present invention.

FIG. 11 is another example of the mobilityControlInfo information element according to the embodiment of the present invention.

FIG. 12 is an example of a reconfiguration with synchronization information element according to the embodiment of the present invention.

FIG. 13 is another example of the reconfiguration with synchronization information element according to the embodiment of the present invention.

DESCRIPTION OF EMBODIMENTS

Embodiments of the present invention will be described below in detail with reference to the drawings.

LTE (and LTE-A Pro) and NR may be defined as different Radio Access Technologies (RATs). Further, NR may be defined as a technology included in LTE. LTE may be defined as a technology included in NR. LTE that can be connected to NR with Multi Radio Dual connectivity may be distinguished from conventional LTE. LTE whose core network is a 5GC may be distinguished from conventional LTE whose core network is an EPC. The present embodiment may be applied to NR, LTE, and other RATs. The following description will be given with the use of terms related to LTE and NR, but the present embodiment may be applied to other technologies using other terms. Further, the term "E-UTRA" in the present embodiment may be replaced with the term "LTE", and the term "LTE" may be replaced with the term "E-UTRA".

Figure 1:
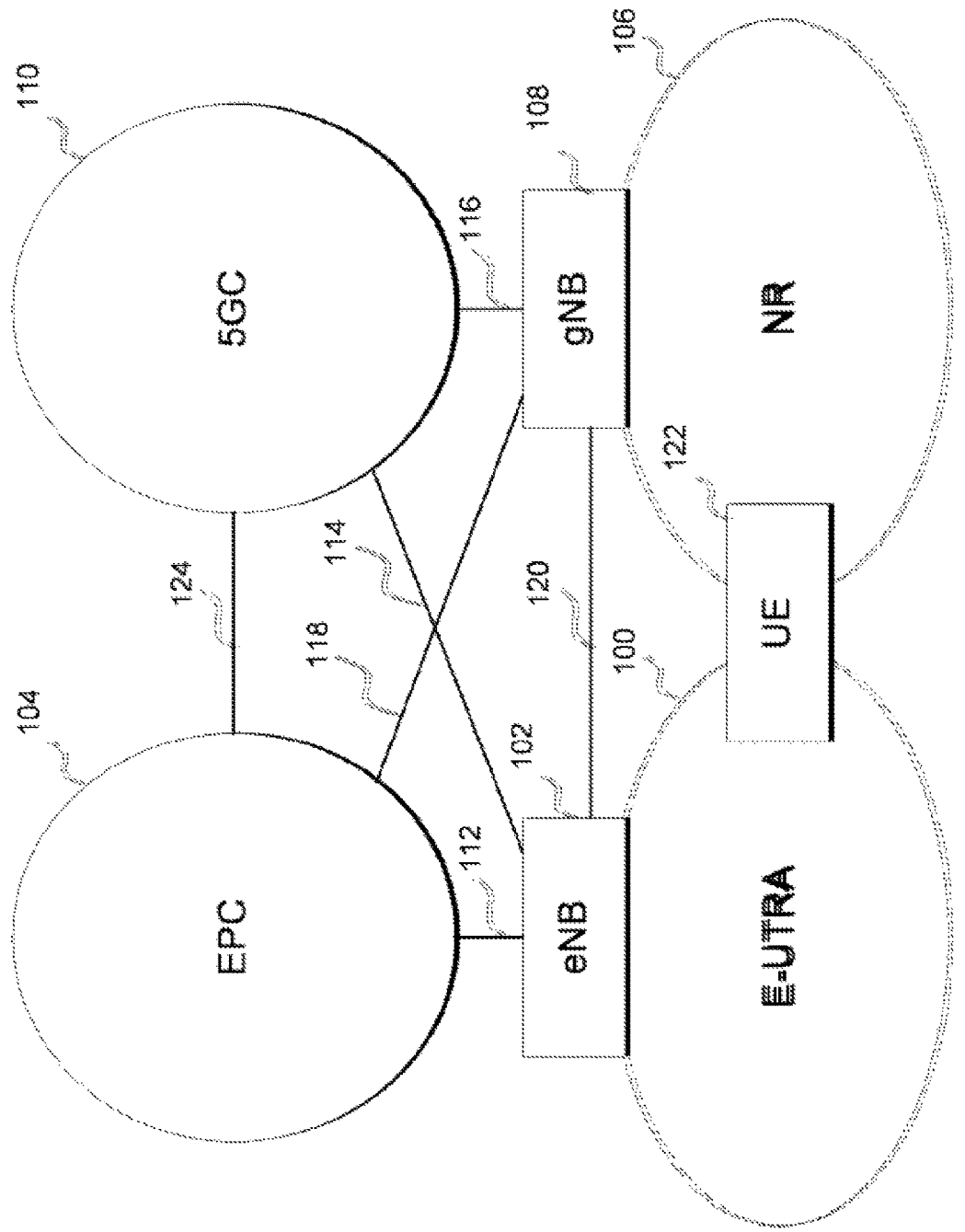
FIG. 1 is a schematic diagram of a communication system according to each embodiment of the present invention.

FIG. 1 is a schematic diagram of a communication system according to each embodiment of the present invention.

An E-UTRA 100 is a radio access technology described in NPL 3 and the like, and includes Cell Groups (CGs) that include one or multiple frequency bands. An E-UTRAN Node B (eNB) 102 is a base station apparatus of the E-UTRA 100. An Evolved Packet Core (EPC) 104 is a core network described in NPL 14 and the like, and is designed as a core network for the E-UTRA 100. An interface 112 is an interface between the eNB 102 and the EPC 104, and includes a Control Plane (CP) through which a control signal passes and a User Plane (UP) through which its user data passes.

An NR 106 is a radio access technology described in NPL 9 and the like, and includes Cell Groups (CGs) that include one or multiple frequency bands. A g Node B (gNB) 108 is a base station apparatus of the NR 106. A 5GC 110 is a core network described in NPL 2 and the like, and is designed as a core network for the NR 106, but may be used as a core network for the E-UTRA 100 having a function of connecting to the 5GC 110. In the following, the E-UTRA 100 may include an E-UTRA 100 having a function of connecting to the 5GC 110.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and the 5GC 110. The interface 114, the interface 116, the interface 118, the interface 120, the interface 124, and the like may be interfaces that allow only the CP, only the UP, or both of the CP and the UP to pass therethrough. The interface 114, the interface 116, the interface 118, the interface 120, the interface 124, and the like need not necessarily be present according to a communication system provided by a common carrier.

A UE 122 is a terminal apparatus corresponding to any one or all of the E-UTRA 100 and the NR 106. As described in any one or all of NPL 3 and NPL 9, in a case that the UE 122 connects with a core network through any one or all of the E-UTRA 100 and the NR 106, a logical path referred to as a Radio Bearer (RB) is established between the UE 122 and any one or all of the E-UTRA 100 and the NR 106. The radio bearer used for the CP is referred to as a Signaling Radio Bearer (SRB), and the radio bearer used for the UP is referred to as a Data Radio Bearer (DRB). Each RB is assigned an RB identifier (an RB Identity or an RB ID), and is uniquely identified. The RB identifier for the SRB is referred to as an SRB identifier (an SRB Identity or an SRB ID), and the RB identifier for the DRB is referred to as a DRB Identity (a DRB ID).

As described in NPL 3, in a case that a connection target core network of the UE 122 is the EPC 104, each DRB that is established between the UE 122 and any one or all of the E-UTRA 100 and the NR 106 is further uniquely associated with each Evolved Packet System (EPS) bearer passing through the EPC 104. Each EPS bearer is assigned an EPS bearer identifier (an Identity or an ID), and is uniquely identified. Further, data passing through the same EPS bearer is guaranteed the same QoS.

As described in NPL 9, in a case that a connection target core network of the UE 122 is the 5GC 110, one or multiple DRBs established between the UE 122 and any one or all of the E-UTRA 100 and the NR 106 is further associated with one of Packet Data Unit (PDU) sessions established in the 5GC 110. In each PDU session, one or multiple QoS flows are present. Each DRB may be associated with (mapped to) one or multiple QoS flows that are present in the associated PDU session, or may not necessarily be associated with any of the QoS flows. Each PDU session is identified with a PDU session identifier (an Identity or an ID). Further, each QoS flow is identified with a QoS flow identifier. Further, data passing through the same QoS flow is guaranteed the same QoS.

In EPC 104, any one or all of the PDU session and the QoS flow are not present, and in the 5GC 110, the EPS bearer is not present. In other words, in a case that the UE 122 connects with the EPC 104, the UE 122 holds information of the EPS bearer, and in a case that the UE 122 connects with the 5GC 110, the UE 122 holds information of any one or all of the PDU session and the QoS flow.

Figure 2:
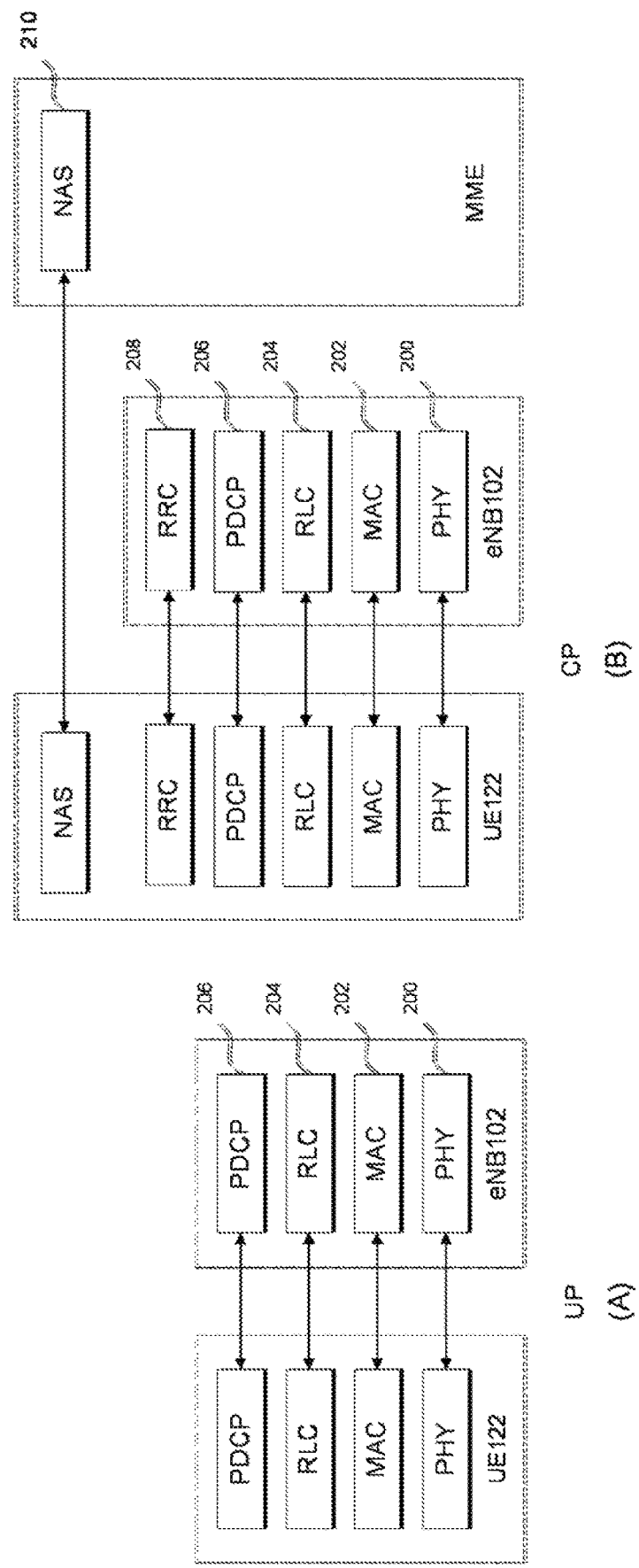
FIG. 2 is a protocol stack diagram of a UP and a CP of a terminal apparatus and a base station apparatus in E-UTRA according to each embodiment of the present invention.

FIG. 2 is a Protocol Stack diagram of the UP and the CP of the terminal apparatus and the base station apparatus in an E-UTRA radio access layer according to each embodiment of the present invention.

FIG. 2(A) is a protocol stack diagram of the UP used in a case that the UE 122 performs communication with the eNB 102 in the E-UTRA 100.

A PHY (Physical layer) 200 is a radio physical layer, and provides a transmission service for an upper layer by using a Physical Channel. The PHY 200 is connected to an upper MAC (Medium Access Control layer) 202 to be described later with a Transport Channel. Through the transport channel, data is transferred between the MAC 202 and the PHY 200. Between the UE 122 and the PHY of the eNB 102, transmission and/or reception of data is performed through a radio physical channel.

The MAC 202 is a medium access control layer for performing mapping of various Logical Channels to various transport channels. The MAC 202 is connected to an upper RLC (Radio Link Control layer) 204 to be described later with a logical channel. The logical channel is roughly categorized according to a type of information to be transmitted, and is specifically categorized into a control channel for transmitting control information and a traffic channel for transmitting user information. The MAC 202 has a function of performing control of the PHY 200 in order to perform intermittent reception and transmission (DRX and DTX), a function of executing a Random Access procedure, a function of indicating information of transmission power, a function of performing HARQ control, and the like (NPL 7).

The RLC 204 is a radio link control layer for dividing (Segmentation) data received from an upper PDCP (Packet Data Convergence Protocol Layer) 206 to be described later, and adjusting the data size so that a lower layer can appropriately perform data transmission. The RLC 200 also has a function of guaranteeing Quality of Service (QoS) required by each piece of data. Specifically, the RLC 204 has a function of retransmission control of data or the like (NPL 6).

The PDCP 206 is a packet data converge protocol layer for efficiently transmitting IP Packets being user data between radio sections. The PDCP 206 may have a header compression function of performing compression of unnecessary control information. The PDCP 206 may also have a function of encryption of data (NPL 5).

Note that pieces of data processed in the MAC 202, the RLC 204, and the PDCP 206 are respectively referred to as a MAC Protocol Data Unit (PDU), an RLC PDU, and a PDCP PDU. Pieces of data delivered to the MAC 202, the RLC 204, and the PDCP 206 from an upper layer or data delivered to the upper layer are respectively referred to as a MAC Service Data Unit (SDU), an RLC SDU, and a PDCP SDU.

FIG. 2(B) is a protocol stack diagram of the CP used in a case that the UE 122 performs communication with the eNB 102 and a Mobility Management Entity (MME) being a logical node that provides a function such as authentication and mobility management, in the E-UTRA 100.

In the protocol stack of the CP, an Radio Resource Control layer (RRC) 208 and a Non Access Strarum (NAS) 210 are present in addition to the PHY 200, the MAC 202, the RLC 204, and the PDCP 206. The RRC 208 is a radio link control layer for performing processing such as establishment and re-establishment, temporary stop (suspend), and temporary stop cancellation (resume) of RRC connection, and configuration such as reconfiguration of RRC connection, for example, establishment, change, release and the like of the Radio Bearer (RB) and the Cell Group, performing control of a logical channel, a transport channel, and a physical channel or the like, and also performing configuration of handover and Measurement or the like. The RB may be categorized into a Signaling Radio Bearer (SRB) and a Data Radio Bearer (DRB), and the SRB may be used as a path for transmitting an RRC message with control information. The DRB may be used as a path for transmitting user data. Configuration of each RB may be performed between the eNB 102 and the RRC 208 of the UE 122. Further, a part including the RLC 204 and the MAC 202 of the RB may be referred to as an RLC bearer (NPL 4). In comparison to the NAS layer for carrying a signal between the MME and the UE 122, a part of the layers or all of the layers of the PHY 200, the MAC 202, the RLC 204, the PDCP 206, and the RRC 208 for carrying a signal and data between the UE 122 and the eNB 102 may be referred to as Access Strarum (AS) layer.

The function categorization of the MAC 202, the RLC 204, the PDCP 206, and the RRC 208 described above is merely an example, and a part or all of the functions may not necessarily be implemented. A part or all of the functions of the layers may be included in another layer.

Note that an IP layer, and a Transmission Control Protocol (TCP) layer, a User Datagram Protocol (UDP) layer, an application layer and the like that are upper than the IP layer are upper layers of a PDCP layer (not illustrated). Further, an RRC layer and a Non Access Strarum (NAS) layer are upper layers of the PDCP layer as well (not illustrated). In other words, the PDCP layer is a lower layer of the RRC layer, the NAS layer, the IP layer, and the Transmission Control Protocol (TCP) layer, the User Datagram Protocol (UDP) layer, and the application layer that are upper than the IP layer.

Figure 3:
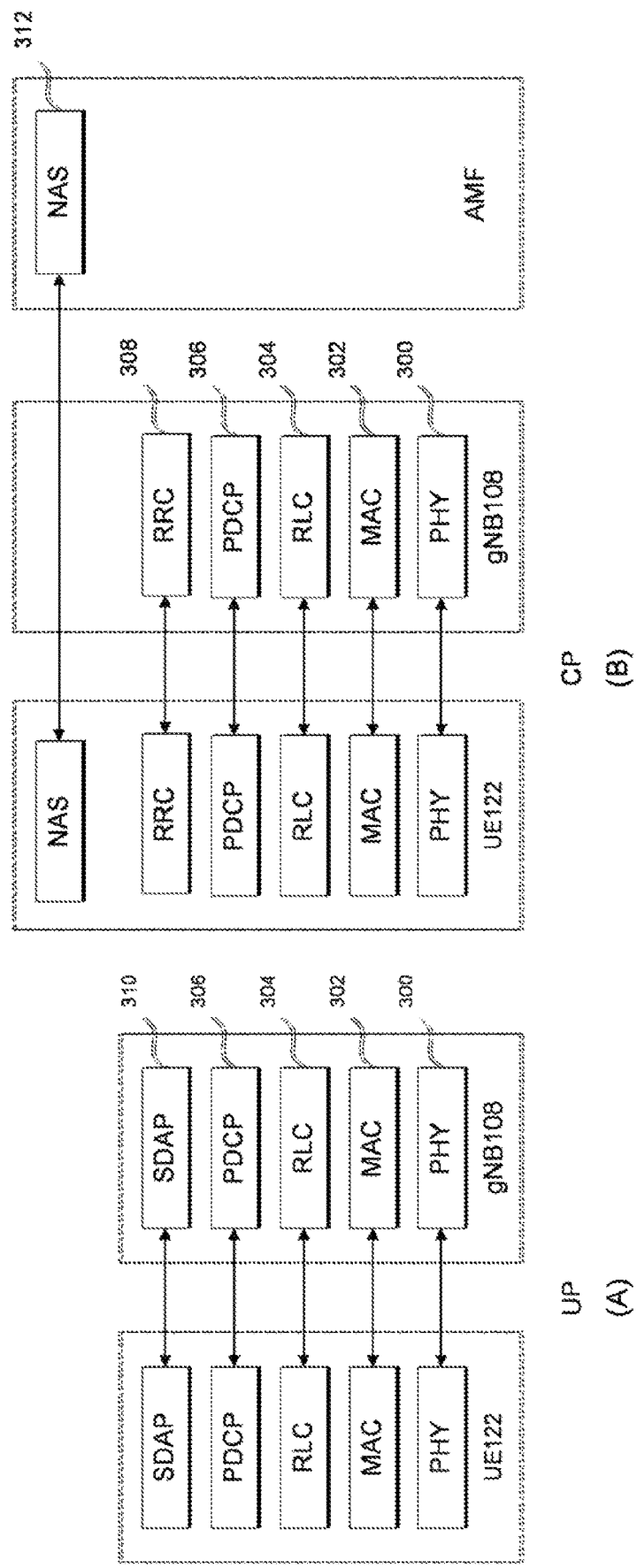
FIG. 3 is a protocol stack diagram of the UP and the CP of a terminal apparatus and a base station apparatus in NR according to each embodiment of the present invention.

FIG. 3 is a Protocol Stack diagram of the UP and the CP of the terminal apparatus and the base station apparatus in an NR radio access layer according to each embodiment of the present invention.

FIG. 3(A) is a protocol stack diagram of the UP used in a case that the UE 122 performs communication with the gNB 108 in the NR 106.

A Physical layer (PHY) 300 is a radio physical layer of NR, and may provide a transmission service for an upper layer by using a Physical Channel. The PHY 300 may be connected to an upper MAC (Medium Access Control layer) 302 to be described later with a Transport Channel. Through the transport channel, data may be transferred between the MAC 302 and the PHY 300. Between the UE 122 and the PHY of the gNB 108, transmission and/or reception of data may be performed through a radio physical channel.

Here, the physical channel will be described.

In radio communication between the terminal apparatus and the base station apparatus, the following physical channels may be used.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used for broadcasting system information required by the terminal apparatus.

In NR, the PBCH may be used for broadcasting a time index (SSB-Index) in a period of a block of a synchronization signal (also referred to as an SS/PBCH block).

The PDCCH is used for transmitting (or carrying) Downlink Control Information (DCI) in a downlink radio communication (radio communication from the base station apparatus 3 to the terminal apparatus). Here, one or multiple pieces of DCI (which may be referred to as DCI formats) are defined for transmission of downlink control information. Specifically, a field for the downlink control information is defined as the DCI, and is mapped to information bits. The PDCCH is transmitted in a PDCCH candidate. The terminal apparatus monitors a set of PDCCH candidates in a serving cell. To monitor means to attempt decoding of the PDCCH according to a certain DCI format. The certain DCI format may be used for scheduling of the PUSCH in the serving cell. The PUSCH may be used for transmission of user data, transmission of an RRC message, and the like.

The PUCCH may be used for transmission of Uplink Control Information (UCI) in uplink radio communication (radio communication from the terminal apparatus to the base station apparatus). Here, the uplink control information may include Channel State Information (CSI) used for indicating a state of a downlink channel. The uplink control information may include a Scheduling Request (SR) used for requesting a UL-SCH resource. The uplink control information may include a Hybrid Automatic Repeat request ACKnowledgement (HARQ-ACK).

The PDSCH may be used for transmitting downlink data (Downlink Shared CHannel (DL-SCH)) from the MAC layer. In the case of the downlink, the PDSCH is also used for transmission of System Information (SI), a Random Access Response (RAR), and the like.

The PUSCH may be used for transmitting an HARQ-ACK and/or CSI together with uplink data (Uplink Shared CHannel (UL-SCH)) from the MAC layer and uplink data. The PUSCH may be used for transmitting only the CSI, or the only the HARQ-ACK and the CSI. Specifically, the PUSCH may be used for transmitting only the UCI. The PDSCH or the PUSCH may be used for transmitting RRC signaling (also referred to as an RRC message) and a MAC control element. Here, in the PDSCH, the RRC signaling transmitted from the base station apparatus may be signaling that is common to multiple terminal apparatuses in a cell. The RRC signaling transmitted from the base station apparatus may be signaling (also referred to as dedicated signaling) that is dedicated to a certain terminal apparatus. Specifically, terminal apparatus specific (UE specific) information may be transmitted by signaling dedicated to a certain terminal apparatus. The PUSCH may be used for transmission of capability of the UE (UE Capability) in the uplink.

The PRACH may be used for transmitting a random access preamble. The PRACH may be used for indicating an initial connection establishment procedure, a handover procedure, a connection re-establishment procedure, synchronization for uplink transmission (timing adjustment), and a request of a PUSCH (UL-SCH) resource.

The MAC 302 is a medium access control layer for performing mapping of various Logical Channels to various transport channels. The MAC 302 may be connected to an upper RLC (Radio Link Control layer) 304 to be described later with a logical channel. The logical channel may be roughly categorized according to a type of information to be transmitted, and may specifically be categorized into a control channel for transmitting control information and a traffic channel for transmitting user information. The MAC 302 may have a function of performing control of the PHY 300 in order to perform intermittent reception and transmission (DRX and DTX), a function of executing a Random Access procedure, a function of indicating information of transmission power, a function of performing HARQ control, and the like (NPL 13).

The RLC 304 is a radio link control layer for dividing (Segmentation) data received from an upper Packet Data Convergence Protocol Layer (PDCP) 206 to be described later, and adjusting the data size so that a lower layer can appropriately perform data transmission. The RLC 304 may also have a function of guaranteeing Quality of Service (QoS) required by each piece of data. Specifically, the RLC 304 may have a function of retransmission control of data or the like (NPL 12).

The PDCP 306 is a packet data converge protocol layer for efficiently transmitting IP Packets being user data between radio sections. The PDCP 306 may have a header compression function of performing compression of unnecessary control information. The PDCP 306 may also have a function of encryption of data (NPL 11).

A Service Data Adaptation Protocol (SDAP) 310 is a service data adaptive protocol layer having a function of performing association (mapping) between a downlink QoS flow transmitted from the 5GC 110 to the terminal apparatus through the base station apparatus and the DRB and mapping of an uplink QoS flow transmitted from the terminal apparatus to the 5GC 110 through the base station apparatus and the DRB, and storing mapping rule information (NPL 16).

FIG. 3(B) is a protocol stack diagram of the CP used in a case that the UE 122 performs communication with the gNB 108 and an Access and Mobility Management function (AMF) being a logical node that provides a function such as authentication and mobility management, in the NR 106.

In the protocol stack of the CP, a Radio Resource Control layer (RRC) 308 and a Non Access Strarum (NAS) 312 are present in addition to the PHY 300, the MAC 302, the RLC 304, and the PDCP 306. The RRC 308 is a radio link control layer for performing processing such as establishment and re-establishment, temporary stop (suspend), and temporary stop cancellation (resume) of RRC connection, and configuration such as reconfiguration of RRC connection, for example, establishment, change, release, and the like of the Radio Bearer (RB) and the Cell Group, performing control of a logical channel, a transport channel, and a physical channel or the like, and also performing configuration of handover and Measurement or the like. The RB may be categorized into a Signaling Radio Bearer (SRB) and a Data Radio Bearer (DRB), and the SRB may be used as a path for transmitting an RRC message with control information. The DRB may be used as a path for transmitting user data. Configuration of each RB may be performed between the gNB 108 and the RRC 308 of the UE 122. Further, a part including the RLC 304 and the MAC 302 of the RB may be referred to as an RLC bearer (NPL 10). In comparison to the NAS layer for carrying a signal between the AMF and the UE 122, a part of the layers or all of the layers of the PHY 300, the MAC 302, the RLC 304, the PDCP 306, the RRC 308, and the SDAP 310 for carrying a signal and data between the UE 122 and the gNB 108 may be referred to as an Access Strarum (AS) layer.

Regarding the SRB, SRB 0 to SRB 3 as below may be defined. SRB 0 may be an SRB for an RRC message using a Common Control CHannel (CCCH) of a logical channel. SRB 1 may be an SRB for an RRC message (which may include a piggybacked NAS message) and for a NAS message before establishment of SRB 2, and a Dedicated Control CHannel (DCCH) of a logical channel may entirely be used. SRB 2 may be an SRB for a NAS message, and a DCCH of a logical channel may entirely be used. Priority of SRB 2 may be lower than priority of SRB 1. SRB 3 may be an SRB for a specific RRC message in a case that EN-DC, NGEN-DC, NR-DC, or the like is configured for the UE 122, and a DCCH of a logical channel may entirely be used. Other SRBs may be provided for other usage.

The function categorization of the MAC 302, the RLC 304, the PDCP 306, the SDAP 310, and the RRC 308 described above is merely an example, and a part or all of the functions may not necessarily be implemented. A part or all of the functions of the layers may be included in another layer.

Note that an IP layer, and a Transmission Control Protocol (TCP) layer, a User Datagram Protocol (UDP) layer, an application layer, and the like that are upper than the IP layer are upper layers of any one or all of an SDAP layer and a PDCP layer (not illustrated). Further, an RRC layer and a Non Access Strarum (NAS) layer are upper layers of any one or all of the SDAP layer and the PDCP layer as well (not illustrated). In other words, any one or all of the SDAP layer and the PDCP layer are lower layers of any one or all of the RRC layer, the NAS layer, the IP layer, and the Transmission Control Protocol (TCP) layer, the User Datagram Protocol (UDP) layer, and the application layer that are upper than the IP layer.

Note that, in each embodiment of the present invention, any one or all of the Session Initiation Protocol (SIP), the Session Description Protocol (SDP), and the like that are used for IMS, or the Real-time Transport Protocol (RTP), the Real-time Transport Control Protocol (RTCP), the Hyper-Text Transfer Protocol (HTTP), and the like that are used for medium communication or medium communication control, and a codec of various media and the like belong to the application layer.

Note that each layer belonging to the AS layer configured for any one or all of the terminal apparatus and the base station apparatus, or the function of each layer may be referred to as an entity. In other words, the physical layer (PHY layer), the MAC layer, the RLC layer, the PDCP layer, the SDAP layer, and the RRC layer that are configured for any one or all of the terminal apparatus and the base station apparatus, or the functions of respective layers may be respectively referred to as a physical entity (PHY entity), a MAC entity, an RLC entity, a PDCP entity, an SDAP entity, and an RRC entity.

Note that, in each embodiment of the present invention, in order to distinguish the protocol of the E-UTRA and the protocol of the NR from each other, the MAC 202, the RLC 204, the PDCP 206, and the RRC 208 may be hereinafter respectively referred to as the MAC for E-UTRA or the MAC for LTE, the RLC for E-UTRA or the RLC for LTE, the PDCP for E-UTRA or the PDCP for LTE, and the RRC for E-UTRA or the RRC for LTE. The MAC 302, the RLC 304, the PDCP 306, and the RRC 308 may be respectively referred to as the MAC for NR, the RLC for NR, the RLC for NR, and the RRC for NR. Alternatively, those may be described as the E-UTRA PDCP, the LTE PDCP, the NR PDCP, or the like, with the use of a space.

As illustrated in FIG. 1, the eNB 102, the gNB 108, the EPC 104, and the 5GC 110 may be connected via the interface 112, the interface 116, the interface 118, the interface 120, and the interface 114. This enables support of various communication systems, and thus the RRC 208 of FIG. 2 may be replaced with the RRC 308 of FIG. 3. Further, the PDCP 206 of FIG. 2 may be replaced with the PDCP 306 of FIG. 3. The RRC 308 of FIG. 3 may have the function of the RRC 208 of FIG. 2. Further, the PDCP 306 of FIG. 3 may be the PDCP 206 of FIG. 2. In the E-UTRA 100, even in a case that the UE 122 communicates with the eNB 102, the NR PDCP may be used as the PDCP.

Next, state transition of the UE 122 in LTE and NR will be described. The UE 122 that is connected to the EPC may be in an RRC_CONNECTED state in a case that RRC connection is established (RRC connection has been established). The UE 122 may be in an RRC_INACTIVE state in a case that RRC connection is suspended (or in a case that the UE 122 is connected to the 5GC). In a case other than the cases described above, the UE 122 may be in an RRC_IDLE state.

Note that the UE 122 that is connected to the EPC does not have the RRC_INACTIVE state, but suspension of RRC connection may be initiated with E-UTRAN. In this case, in a case that RRC connection is suspended, the UE 122 holds an AS context of the UE and an identifier (resumeIdentity) used for restoration and transitions to the RRC_IDLE state. In a case that the UE 122 holds the AS context of the UE, restoration of RRC connection is Permitted by E-UTRAN, and the UE 122 needs to transition from the RRC_IDLE state to the RRC_CONNECTED state, restoration of the suspended RRC connection may be initiated by an upper layer (for example, the NAS layer).

Specifically, definition of suspension may be different between the UE 122 connected to the EPC and the UE 122 connected to the 5GC. All or a part of procedures for restoration from the suspension may be different between a case that the UE 122 is connected to the EPC (in a case of suspension in the RRC_IDLE state) and in a case that the UE 122 is connected to the 5GC (in a case of suspension in the RRC_INACTIVE state).

Note that the RRC_CONNECTED state, the RRC_INACTIVE state, and the RRC_IDLE state may be respectively referred to as a connected state (connected mode), an inactive state (inactive mode), and a suspended state (idle mode).

The AS context of the UE held by the UE 122 may be information including all or a part of the current RRC configuration, the current security context, a PDCP state including a RObust Header Compression (ROHC) state, a Cell Radio Network Temporary Identifier (C-RNTI) used in a PCell of a connection Source, a cell identifier (cellIdentity), and a physical cell identifier of the PCell of the connection source. Note that the AS context of the UE held by any one or all of the eNB 102 and the gNB 108 may include information the same as the AS context of the UE held by the UE 122, or information different from the information included in the AS context of the UE held by the UE 122 may be included.

The security context may be information including all or a part of an encryption key in an AS level, a Next Hop parameter (NH), a Next Hop Chaining Counter parameter (NCC) used for access key derivation of the next hop, an identifier of encryption algorithm of a selected AS level, and a counter used for replay protection.

Figure 4:
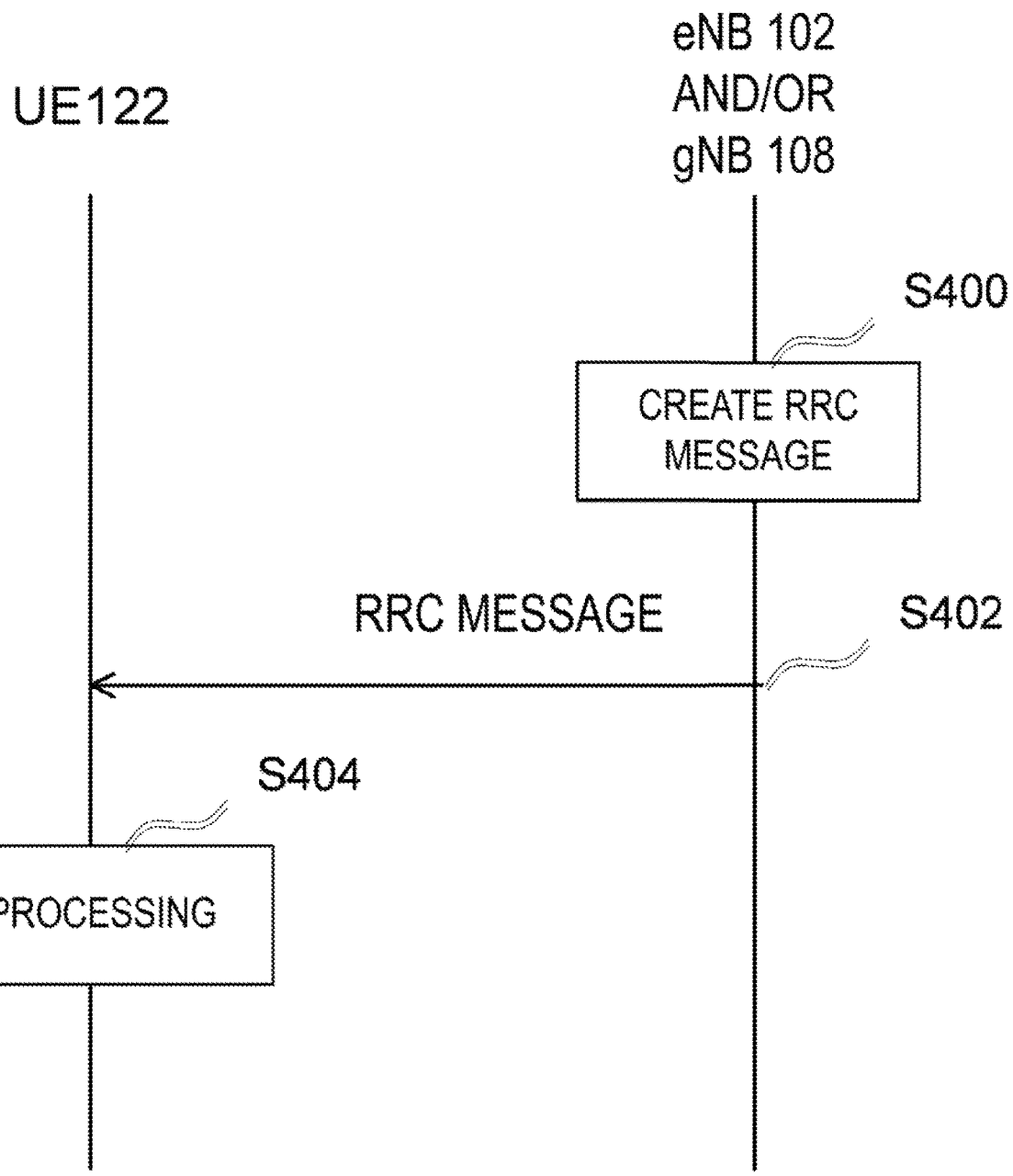
FIG. 4 is a diagram illustrating an example of a flow of a procedure for various configurations in an RRC 208 and/or an RRC 308 according to each embodiment of the present invention.

FIG. 4 is a diagram illustrating an example of a flow of a procedure for various configurations in the RRC 208 and/or the RRC 308 according to each embodiment of the present invention. FIG. 4 is an example of a flow of a case that an RRC message is transmitted from the base station apparatus (the eNB 102 and/or the gNB 108) to the terminal apparatus (the UE 122).

In FIG. 4, the base station apparatus creates an RRC message (Step S400). The creation of the RRC message in the base station apparatus may be performed in a case that the base station apparatus delivers broadcast information (System Information (SI)) and paging information, or may be performed in a case that the base station apparatus determines that a specific terminal apparatus needs to be caused to perform processing, examples of which include cases of configuration related to security, reconfiguration of RRC connection (processing of a radio line bearer (establishment, change, release, and the like), processing of a cell group (establishment, addition, change, release, and the like), measurement configuration, handover configuration, and the like), release of an RRC connection state, and the like. Further, the RRC message may be used for a handover command to different RATs. The RRC message includes information (parameter) for indicating various pieces of information and configurations. In the specifications related to RRC of NPL 4, NPL 10, or the like, these parameters are referred to as a field and/or an information element, and are described by using a description method referred to as Abstract Syntax Notation One (ASN.1).

In FIG. 4, next, the base station apparatus transmits the created RRC message to the terminal apparatus (Step S402). Next, the terminal apparatus follows the received RRC message described above, and performs processing in a case that processing such as configuration is necessary (Step S404).

Note that the creation of the RRC message is not limited to the example described above, and may be created for other purposes as described in NPL 4, NPL 10, or the like.

For example, the RRC message may be used for configuration related to Dual Connectivity (DC), and Multi-Radio Dual Connectivity (MR-DC) described in NPL 8.

Dual Connectivity (DC) may refer to a technology in which data communication is performed by using radio resources of cell groups configured by two respective base station apparatuses (nodes), specifically, a Master Cell Group (MCG) configured by a Master Node (MN) and a Secondery Cell Group (SCG) configured by a Secondery Node (SN). The master node and the secondary node may be the same node (the same base station apparatus). Further, MR-DC described in NPL 8 may refer to a technology in which cells of Radio Access Technologies (RATs) of both of E-UTRA and NR are made into cell groups for each RAT and allocated to the UE, and data communication is performed by using radio resources of both of the MCG and the SCG. In M R-DC, the master node may be a base station that has main RRC functions according to MR-DC, for example, functions of addition of a secondary node, establishment, change, and release of an RB, addition, change, and release of an MCG, handover, and the like, and the secondary node may be a base station that has a part of RRC functions, for example, change and release of an SCG and the like.

In MR-DC described in NPL 8, the RRC of the RAT of the master node may be used for performing configurations of both of the MCG and the SCG. For example, in E-UTRA-NR Dual Connectivity (EN-DC), which is MR-DC of a case that the core network is the EPC 104 and the master node is the eNB 102 (also referred to as an enhanced eNB 102), and in NG-RAN E-UTRA-NR Dual Connectivity (NGEN-DC), which is MR-DC of a case that the core network is the 5GC 110 and the master node is the eNB 102, the RRC message of E-UTRA described in NPL 4 may be transmitted and/or received between the eNB 102 and the UE 122. In this case, in the RRC message, not only configuration information of LTE (E-UTRA) but also configuration information of NR described in NPL 10 may be included. Further, the RRC message transmitted from the eNB 102 to the UE 122 may be transmitted from the eNB 102 to the UE 122 via the gNB 108. The configuration of the RRC message may be used for E-UTRA/5GC (option 5 described in NPL 17), which is non-MR-DC in which the eNB 102 (enhanced eNB) uses the 5GC as the core network.

Further, in contrast, in MR-DC described in NPL 8, in NR-E-UTRA Dual Connectivity (NE-DC), which is MR-DC of a case that the core network is the 5GC 110 and the master node is the gNB 108, the RRC message of NR described in NPL 10 may be transmitted and/or received between the gNB 108 and the UE 122. In this case, in the RRC message, not only configuration information of NR but also configuration information of LTE (E-UTRA) described in NPL 4 may be included. Further, the RRC message transmitted from the gNB 108 to the UE 122 may be transmitted from the gNB 108 to the UE 122 via the eNB 102.

Note that, without limiting to a case that MR-DC is used, the RRC message for NR may be included in the RRC message for E-UTRA transmitted from the eNB 102 to the UE 122, and the RRC message for E-UTRA may be included in the RRC message for NR transmitted from the gNB 108 to the UE 122.

Network configuration in which the master node is the eNB 102 and the EPC 104 is used as the core network may be referred to as E-UTRA/EPC. Further, network configuration in which the master node is the eNB 102 and the 5GC 110 is used as the core network may be referred to as E-UTRA/5GC. Further, network configuration in which the master node is the gNB 108 and the 5GC 110 is used as the core network may be referred to as NR or NR/5GC. Further, these terms need not necessarily be limited to a case that DC is configured. In a case that DC is not configured, the master node described above may refer to the base station apparatus that performs communication with the terminal apparatus.

In the following description, the eNB 102 and/or the gNB 108 is also simply referred to as a base station apparatus, and the UE 122 is also simply referred to as a terminal apparatus.

In a case that RRC connection is established, RRC connection is re-established, or handover is performed, one serving cell provides mobility information of NAS. In a case that RRC connection is re-established or handover is performed, one serving cell provides security input. The serving cell is referred to as a primary cell (PCell). Further, depending on capability of the terminal apparatus, one or multiple serving cells (secondary cells, SCells) may be additionally configured together with the primary cell.

A set of serving cells including two subsets may be configured for the terminal apparatus. The two subsets may include a cell group (master cell group) including one or multiple serving cells including a primary cell (PCell) and one or multiple cell groups (secondary cell group) including one or multiple serving cells including a primary secondary cell (PSCell) and not including a primary cell. The primary secondary cell may be a cell in which PUCCH resources are configured.

An example of operation related to Radio Link Failure (RLF) caused by the terminal apparatus in RRC connection will be described.

The terminal apparatus acquires, from the base station apparatus located in a serving cell, information such as values (t310 and t313) of timers (for example, T310 and T313) for detection of problems of the physical layer (Physical layer problems) of the serving cell. N310 and N313 being thresholds for the number of times of detection out of synchronization (out-of?sync (OoS)), and N311 and N314 being thresholds for the number of times of detection in synchronization (in?sync (IS)), through broadcast information and an RRC message specific to a user. As the thresholds for the values of the timers and the number of times, default values may be configured. The terms for the timers may be different between EUTRA and NR.

For the sake of radio link monitoring, in a case that radio link quality of a serving cell is estimated to be worse than a specific threshold (Qout) for over a specific period (for example, TEvaluate_Qout=200 ms), based on information such as received power of a received reference signal and/or received power of a synchronization signal and/or an error rate of packets, for example, a physical layer processing unit of the terminal apparatus indicates "out of synchronization (out-of-sync)" to an RRC layer processing unit being an upper layer. In a case that radio link quality of a serving cell is estimated to exceed a specific threshold (Qin) for over a specific period (for example, TEvaluate_Qin=100 ms), based on information such as received power of a received reference signal and/or received power of a synchronization signal and/or an error rate of packets, for example, the physical layer processing unit indicates "in synchronization (in-sync)" to the RRC layer processing unit being an upper layer. Note that the physical layer processing unit may perform the indicating of out of synchronization or in synchronization to the upper layer at specific intervals (for example, TReport_sync=10 ms) or longer.

Here, for example, the threshold Qout may be defined as a level at which a downlink radio link cannot be reliably received and also a Block error rate of transmission of a hypothetical downlink control channel (PDCCH) based on a predetermined parameter is a first specific ratio. For example, the threshold Qin may be defined as a level at which downlink radio link quality can be significantly more securely received than the state of Qout and a block error rate of transmission of a hypothetical downlink control channel based on a predetermined parameter is a second specific ratio. Multiple block error rates (levels of the threshold Qout and the threshold Qin) may be defined based on a frequency and a subcarrier spacing in use, a type of service, or the like. The first specific ratio and/or the second specific ratio may be a predetermined value determined in a specification. The first specific ratio and/or the second specific ratio may be a value indicated or broadcast from the base station apparatus to the terminal apparatus(es).

In a serving cell (for example, a PCell and/or a PSCell), the terminal apparatus may perform radio link monitoring by using a certain type of reference signal (for example, a cell specific reference signal (CRS)). The terminal apparatus may receive, from the base station apparatus, configuration (radio link monitoring configuration (RadioLinkMonitoringConfig)) indicating which reference signal(s) is to be used for radio link monitoring in the serving cell (for example, the PCell and/or the PSCell), and perform radio link monitoring by using the one or multiple configured reference signals (here, referred to as an RLM-RS). The terminal apparatus may perform radio link monitoring by using another signal. The physical layer processing unit of the terminal apparatus may indicate in synchronization to an upper layer in a case that a condition of in synchronization is satisfied in the serving cell (for example, the PCell and/or the PSCell).

In the radio link monitoring configuration, information indicating the purpose of monitoring and identifier information indicating a reference signal may be included. For example, the purpose of monitoring may include a purpose of monitoring a radio link failure, a purpose of monitoring a failure of a beam, both of the above purposes, and the like. For example, in the identifier information indicating a reference signal, information indicating an identifier (SSB-Index) of a Synchronization Signal Block (SSB) of a cell may be included. Specifically, in the reference signal, a synchronization signal may be included. For example, in the identifier information indicating a reference signal, information indicating an identifier associated with a channel state information reference signal (CSI-RS) configured for the terminal apparatus may be included.

In the primary cell, in a case that the RRC layer processing unit of the terminal apparatus receives consecutive out of synchronization indicated from the physical layer processing unit a predetermined number of times (N310 times), the RRC layer processing unit may Start or Restart a timer (T310). In a case that the RRC layer processing unit of the terminal apparatus receives consecutive in synchronization a predetermined number of times (N311 times), the RRC layer processing unit may Stop the timer (T310). In a case that the timer (T310) Expires, the RRC layer processing unit of the terminal apparatus may perform transition to an idle state or a re-establishment procedure of RRC connection. For example, operation of the terminal apparatus may be different according to an established state of AS Security. In a case that AS Security has not yet been established, the terminal apparatus may transition to an RRC IDLE state, whereas in a case that AS Security has already been established, the terminal apparatus may perform a re-establishment (Re?establishment) procedure of RRC connection. In determination of starting or restarting the timer T310, a condition that none of a timer T300, a timer T301, a timer T304, and a timer T311 runs may be added to a condition.

An example of conditions of start, stop, and expiration of each of the timers of EUTRA is illustrated in FIG. 9. Note that, although the name of the timer and/or the name of the message may be different, similar conditions may be applied to NR as well.

In a primary secondary cell, in a case that the RRC layer processing unit of the terminal apparatus receives consecutive out of synchronization indicated from the physical layer processing unit a predetermined number of times (N313 times), the RRC layer processing unit may Start or Restart a timer (T313). In a case that the RRC layer processing unit of the terminal apparatus receives consecutive in synchronization a predetermined number of times (N314 times), the RRC layer processing unit may Stop the timer (T313). In a case that the timer (T313) Expires, the RRC layer processing unit of the terminal apparatus may perform an SCG failure information procedure for indicating an SCG failure to a network.

In SpCells (a PCell in the MCG and the a PSCell in the SCG), in a case that the RRC layer processing unit of the terminal apparatus receives consecutive out of synchronization indicated from the physical layer processing unit a predetermined number of times (N310 times) in each SpCell, the RRC layer processing unit may Start or Restart the timer (T310) of the SpCells. In a case that the RRC layer processing unit of the terminal apparatus receives consecutive in synchronization a predetermined number of times (N311 times) in each SpCell, the RRC layer processing unit may Stop the timer (T310) of the SpCells. In a case that the timer (T310) of each SpCell Expires and the SpCells are PCells, the RRC layer processing unit of the terminal apparatus may perform transition to an idle state or a re-establishment procedure of RRC connection. In a case that the SpCells are PSCells, the SCG failure information procedure for indicating an SCG failure to a network may be performed.

The above description is an example of a case that intermittent reception (DRX) is not configured for the terminal apparatus. In a case that DRX is configured for the terminal apparatus, the RRC layer processing unit of the terminal apparatus may perform configuration for the physical layer processing unit so that the physical layer processing unit uses values different from those in a case that DRX is not configured, regarding a period for measuring radio link quality and intervals of indicating to an upper layer. Note that, even in a case that DRX is configured, in a case that the timer (T310, T313) runs, values of a case that DRX is not configured may be used, regarding the period for measuring radio link quality for estimating in synchronization and intervals of indicating to an upper layer.

For example, in order to detect an early physical layer problem, in a case that the RRC layer processing unit of the terminal apparatus receives early out of synchronization indicated from the physical layer processing unit a predetermined number of times (N310 times), the RRC layer processing unit may Start a timer (T314). In a case that the RRC layer processing unit of the terminal apparatus receives consecutive in synchronization a predetermined number of times (N311 times) while T314 runs, the RRC layer processing unit may Stop the timer (T314).

For example, in order to detect an early physical layer improvement, in a case that the RRC layer processing unit of the terminal apparatus receives consecutive early in synchronization indicated from the physical layer processing unit a predetermined number of times (N311 times), the RRC layer processing unit may Start a timer (T315). In a case that the RRC layer processing unit of the terminal apparatus receives consecutive in synchronization a predetermined number of times (N311 times) while T315 runs, the RRC layer processing unit may Stop the timer (T315).

For example, in a case that measurement is reported to the base station apparatus, performance of first measurement (for example, performance of measurement using the timer T312) is configured for configuration of the measurement, the timer T310 runs, and the timer T312 does not run, the timer T312 is started. In a case that the RRC layer processing unit of the terminal apparatus receives consecutive in synchronization a predetermined number of times (N311 times), the RRC layer processing unit may stop the timer (T312).

In a case that the RLM-RS is not explicitly or implicitly configured from a network, the RLM-RS may be undefined. Specifically, in a case that configuration of the RLM-RS is not performed for the terminal apparatus from a network (for example, the base station apparatus), the terminal apparatus may not necessarily perform radio link monitoring.

The RLM-RS is a reference signal used in radio link monitoring, and multiple RLM-RSs may be configured for the terminal apparatus. Resources of one RLM-RS may be resources (or ports) of one SS block or one CSI-RS.

Radio link monitoring using a CRS may be performed in a cell of EUTRA, and radio link monitoring using an RLM-RS may be performed in a cell of NR, but this is not restrictive.

Detection of a radio link failure based on radio link monitoring will be described.

Regarding the terminal apparatus, in a case that the timer T310 Expires, the timer T312 expires, the terminal apparatus receives an indication of a problem of random access from a MAC layer of the MCG while none of multiple specific timers runs, or the terminal apparatus receives an indication that retransmission of the SRB or the DRB has reached a maximum number of times of retransmission from an RLC layer of the MCG, the terminal apparatus determines that a radio link failure is detected in the MCG. The specific timer does not include the timer T310 and the timer T312.

In a case that transmission of a random access preamble is performed in the SpCell in a case that the number of times of retransmission of the random access preamble has reached a predetermined number of times in a MAC entity, the problem of random access may be indicated from the MAC entity of a cell group including the SpCell to an upper layer (here, an RRC entity).

In a case that the terminal apparatus determines that a radio link failure is detected in the MCG, the terminal apparatus Stores various pieces of information as radio link failure information. Then, in a case that security of AS is not Activated, the release cause is configured to "other", and processing of exiting RRC_CONNECTED is initiated. In a case that AS security is activated, a procedure of RRC connection re-establishment is initiated.

Regarding the terminal apparatus, in a case that the timer T313 Expires, the terminal apparatus receives an indication of a problem of random access from a MAC layer of the SCG, or the terminal apparatus receives an indication that retransmission has reached a maximum number of times of retransmission from an RLC layer of the SCG, the terminal apparatus determines that a radio link failure is detected in the SCG, and initiates processing for reporting related information to the base station apparatus as an SCG radio link failure.

Regarding the terminal apparatus, in a case that the timer T314 Expires, the terminal apparatus determines that an "early out of synchronization" event is detected, and initiates processing for reporting related information to the base station apparatus.

Regarding the terminal apparatus, in a case that the timer T315 Expires, the terminal apparatus determines that an "early in synchronization" event is detected, and initiates processing for reporting related information to the base station apparatus.

The re-establishment procedure of RRC connection will be described.

The purpose of the re-establishment procedure of RRC connection is to re-establish RRC connection, and may be accompanied with a Resumption procedure of SRB 1, a reactivation of security, and configuration of only the PCell.

The re-establishment procedure of RRC connection may be initiated in a case that any one of the conditions of (A) to (E) described below is met.
- (A) A case that a radio link failure of the MCG is detected
- (B) A case that handover fails (in NR, reconfiguration with synchronization in the MCG fails)
- (C) A case that mobility to another RAT fails
- (D) A case that a failure of a check on integrity (Integrity check) related to SRB 1 or SRB 2 is indicated from a lower layer
- (E) A case that reconfiguration of RRC connection fails In a case that the re-establishment procedure of RRC connection is initiated, the terminal apparatus performs a part or all of the processing of (A) to (J) described below.
- (A) In a case that the timer T310 runs, the timer T310 is stopped
- (B) In a case that the timer T312 runs, the timer T312 is stopped
- (C) In a case that the timer T313 runs, the timer T313 is stopped
- (C) In a case that the timer T314 runs, the timer T314 is stopped
- (D) The timer T311 is started
- (E) All of the RBs other than SRB 0 are Suspended
- (F) The MAC is reset
- (G) In a case that the SCell of the MCG is configured, the SCell is released
- (H) Default physical channel configuration is applied
- (I) Default MAC main configuration is applied to the MCG
- (J) A cell selection procedure is performed In a case that a cell of the same optimal RAT is selected through a cell selection procedure, the terminal apparatus performs the following processing.

In a case that the terminal apparatus connects to the 5GC and a selected cell can be connected only in the EPC, or the terminal apparatus connects to the EPC and a selected cell can be connected only in the 5GC, the terminal apparatus configures the release cause to "RRC connection failure", and performs an Action of exiting RRC_CONNECTED. Otherwise, the timer T311 is stopped, the timer T301 is started, and transmission of a re-establishment request (ReestablishmentRequest) message of RRC connection is initiated.

In a case that the timer T311 expires, the terminal apparatus configures the release cause to "RRC connection failure", and performs an Action of exiting RRC_CONNECTED.

In a case that the timer T301 expires, or a selected cell is no longer an optimal cell in terms of a cell selection criterion, the terminal apparatus configures the release cause to "RRC connection failure", and performs an Action of exiting RRC_CONNECTED.

Handover will be described.

Figure 7:
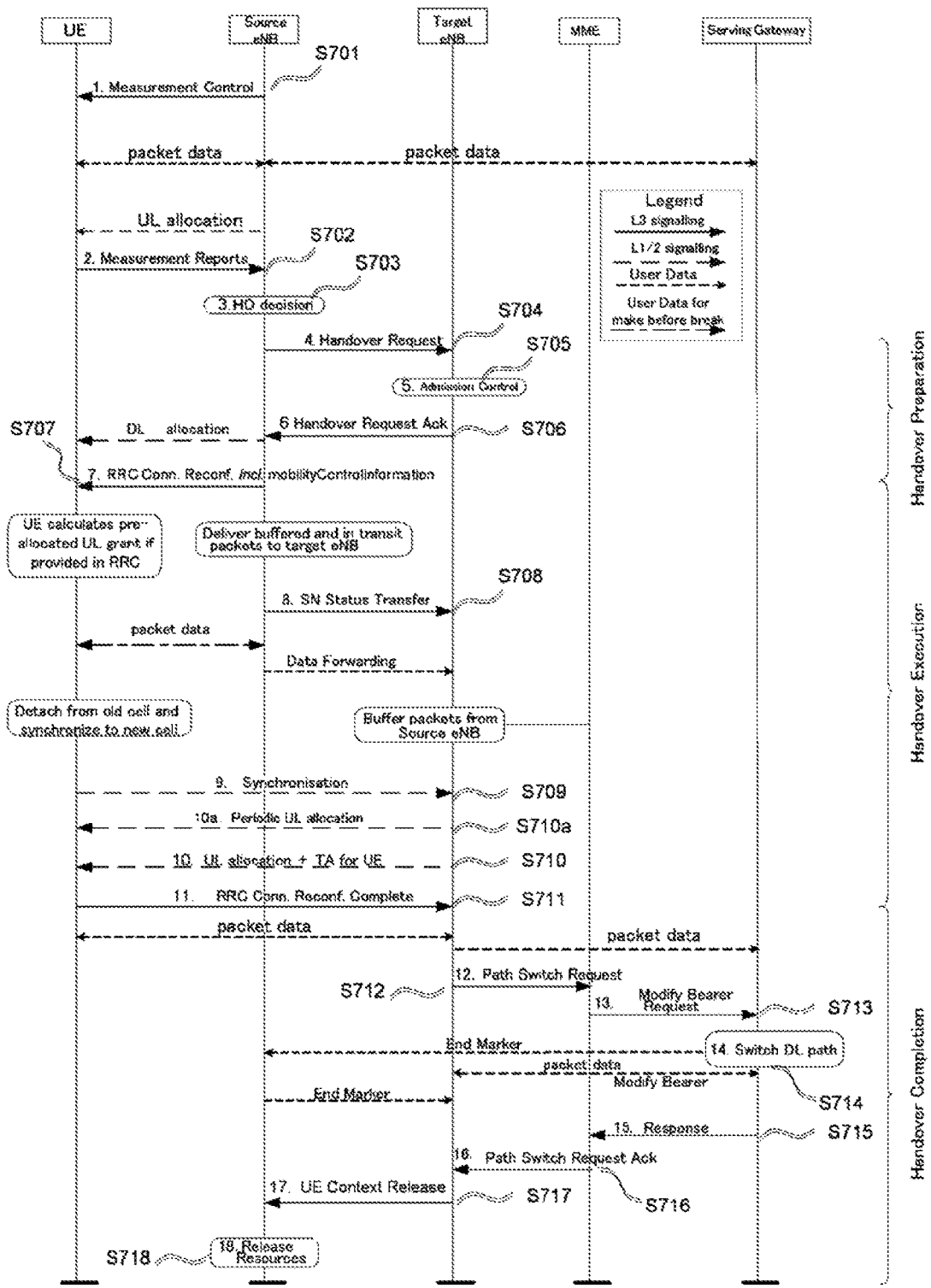
FIG. 7 is an example of processing related to handover in EUTRA according to each embodiment of the present invention.

In EUTRA, an example of processing related to handover in the same RATs (specifically, in EUTRAs) will be described with reference to FIG. 7. The description with reference to FIG. 7 is merely an example, and a part of processing may be omitted, and other processing may be included. Alternatively, other processing may be performed as the processing related to handover.

In FIG. 7, a handover source base station apparatus (Source eNB) configures measurement of neighboring cells for the terminal apparatus (Step S701).

The terminal apparatus performs the measurement configured from the Source eNB, and reports measurement results to the Source eNB, based on a report condition (Step S702).

The Source eNB determines hand-off of the terminal apparatus, based on reported information such as the measurement results (Step S703).

The Source eNB issues a handover request message including information necessary for preparation of handover to a base station apparatus (Target eNB) being a handover target (Step S704).

Admission control may be performed in the Target eNB. The Target eNB configures necessary resources. (Step S705).

The Target eNB transmits a handover request acknowledge message (HANDOVER REQUEST ACKNOWLEDGE message) to the Source eNB (Step S706). In the handover request acknowledge message, a container transparently transmitted to the terminal apparatus is included as an RRC message for performing handover. In the container, a part or all of a new C-RNTI, a security algorithm identifier of the Target eNB for selected security algorithm, a preamble of a dedicated random access channel (random access preamble), and system information of a target cell may be included.

The Source eNB transmits a container (a first RRC connection reconfiguration message (RRCConnectionReconfiguration message) including a mobility control information (mobilityControlInfo) Information Element (IE)) received from the Target eNB to the terminal apparatus (Step S707).

Note that, in a case that make-before-break handover (Make-Before-Break HO (MBB-HO)) is configured for the terminal apparatus through the first RRC connection reconfiguration message, the terminal apparatus receives the first RRC connection reconfiguration message, and then maintains connection with the Source eNB until first uplink transmission is performed in at least the Target eNB. Note that the make-before-break handover may be selected out of multiple configurations. For example, with makeBeforeBreak-r14 in a field included in a mobilityControlInfo information element already put into a specification being configured to be True, it may be determined that the make-before-break handover is configured. For example, with newly defined makeBeforeBreak-r16 being included in a field in the mobilityControlInfo information element and makeBeforeBreak-r16 being configured to be True, it may be determined that the make-before-break handover is configured. The field makeBeforeBreak-r16 may have information elements including various configurations as values.

The Source eNB transmits an SN STATUS TRANSFER message for Conveying a reception state of a sequence number of an uplink PDCP and a transmission state of a sequence number of a downlink PDCP to the Target eNB (Step S708).

In a case that RACH-less handover is not configured through the first RRC connection reconfiguration message, the terminal apparatus Performs synchronization with the Target eNB, and accesses a cell being a target by using a random access channel. In this case, in a case that a dedicated random access preamble is indicated by the first RRC connection reconfiguration message, a Contention-free random access procedure is performed, whereas in a case that the dedicated random access preamble is not indicated, a Contention-based random access procedure is performed. In a case that the RACH-less handover is configured through the first RRC connection reconfiguration message, the terminal apparatus performs synchronization with the Target eNB (Step S709).

In a case that the RACH-less handover is not configured through the first RRC connection reconfiguration message, the Target eNB returns uplink allocation and information of timing advance to the terminal apparatus (Step S710).

In a case that the RACH-less handover is configured through the first RRC connection reconfiguration message, and periodic uplink grant pre-allocation (periodic pre-allocated uplink grant) fails to be acquired through the first RRC connection reconfiguration message, the terminal apparatus receives the uplink grant on the PDCCH of a target cell. The terminal apparatus uses the first Available uplink grant after synchronizing with the target cell (Step S710a).

In a case that the RACH-less handover is not configured, and the terminal apparatus successfully accesses the target cell, the terminal apparatus transmits an RRC connection reconfiguration complete message (RRCConnectionReconfigurationComplete message) to the Target eNB in order to Confirm the handover. The RRC connection reconfiguration complete message indicates completion of the handover procedure of the terminal apparatus. In the RRC connection reconfiguration complete message, a C-RNTI is included, and the Target eNB Verifies the C-RNTI of the received RRC connection reconfiguration complete message.

In a case that the RACH-less handover is configured, and the terminal apparatus receives an uplink grant, the terminal apparatus transmits an RRC connection reconfiguration complete message (RRCConnectionReconfigurationComplete message) to the Target eNB in order to Confirm the handover. In the RRC connection reconfiguration complete message, a C-RNTI is included, and the Target eNB Verifies the C-RNTI of the received RRC connection reconfiguration complete message. In a case that the terminal apparatus receives a UE contention resolution identifier MAC control element (UE contention resolution identity MAC control element) from the Target eNB, the handover procedure of the terminal apparatus completes (Step S711).

The Target eNB transmits a path switch request (PATH SWITCH REQUEST) message to an MME in order to inform the MME that the terminal apparatus has changed its cell (Step S712).

The MME transmits a bearer modify request (MODIFY BEARER REQUEST) message to a serving gateway (S-GW) (Step S713).

The S-GW switches a downlink data path to the target side. The S-GW transmits one or multiple end marker packets to the Source eNB, and releases resources of the user plane to the Source eNB (Step S714).

To the MME, the S-GW transmits a bearer modify response (MODIFY BEARER RESPONSE) message to the MME (Step S715).

The MME confirms the path switch request through a path switch request acknowledge (PATH SWITCH REQUEST ACKNOWLEDGE) message (Step S716).

By transmitting a UE context release (UE CONTEXT RELEASE) message to the Source eNB, the Target eNB indicates success of the handover, and triggers release of resources by the Source eNB. The Target eNB may transmit the message after receiving the path switch request acknowledge message (Step S717).

Reception of the UE context release message allows the Source eNB to release radio related to the UE context and the resources related to the C plane. Ongoing data transfer may be continued (Step S718).

In a case that the timer T304 expires, the terminal apparatus performs a part or all of the processing of (A) to (D) described below.
  (A) The Configuration of a dedicated random access channel configured through the first RRC connection reconfiguration message is considered unavailable
  (B) The configuration of the terminal apparatus is brought back to the configuration used in the PCell of handover sources except for the configuration of a dedicated physical channel and the main configuration of the MAC layer, and the configuration of semi-persistent scheduling
  (C) Related information is stored as handover failure information
  (D) The re-establishment procedure of RRC connection is initiated, and the procedure of RRC connection reconfiguration is ended Details of processing of the terminal apparatus that has received the first RRC connection reconfiguration message will be described. In the first RRC connection reconfiguration message, the mobility control information (mobilityControlInfo) information element may be included. In the mobilityControlInfo information element, parameters (for example, an identifier of a target cell and information of a carrier frequency) related to mobility of network control from another RAT to EUTRA or within EUTRA are included.

Figure 8:
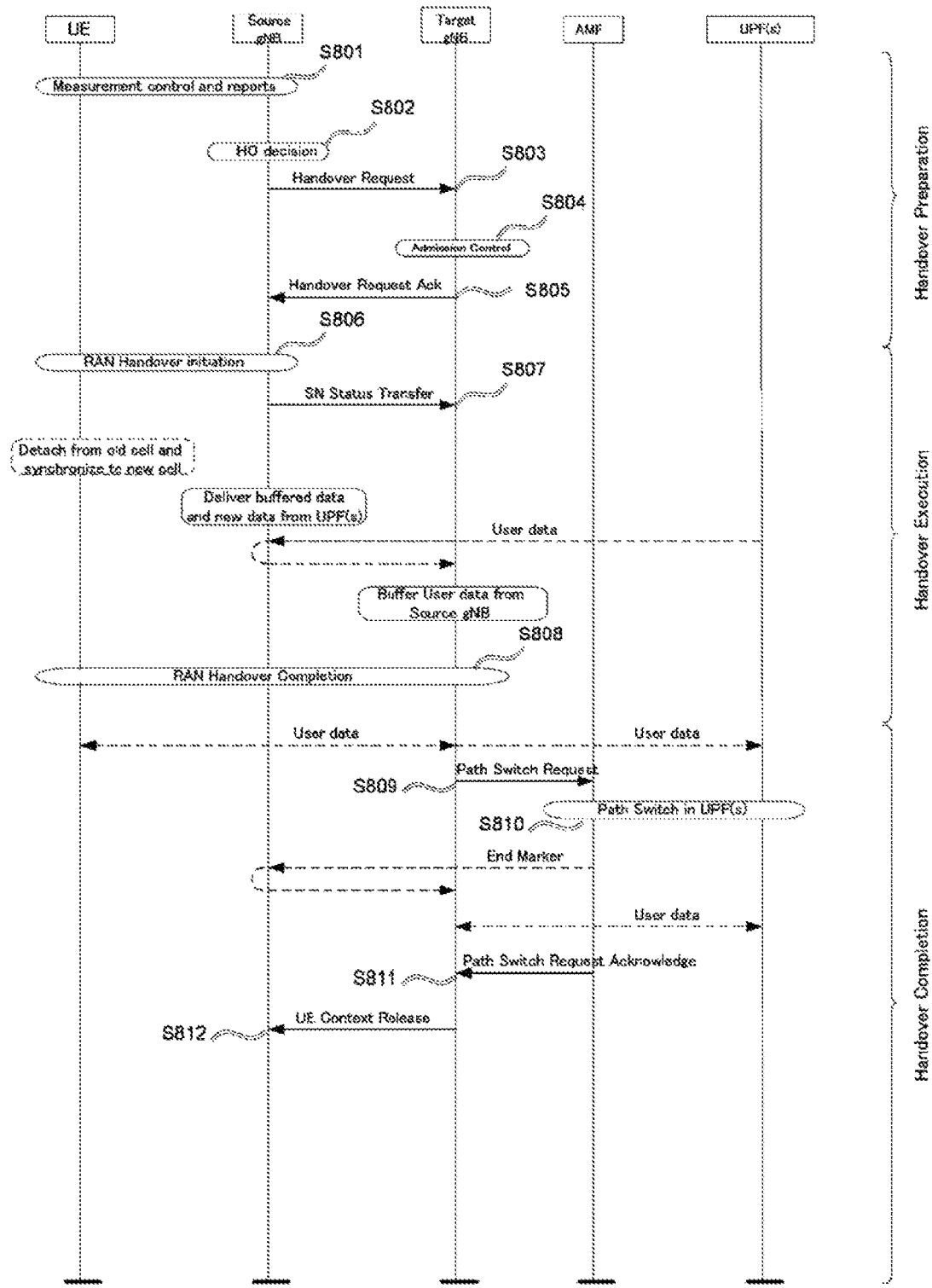
FIG. 8 is an example of processing related to handover in NR according to each embodiment of the present invention.

In a case that the terminal apparatus receives the RRC connection reconfiguration message (first RRC connection reconfiguration message) including the mobilityControlInfo information element and is able to comply with the configuration of the message, the terminal apparatus performs a part or all of the processing of (A) to (G) described below.
  (A) In a case that the timer T310 runs, the timer T310 is stopped
  (B) In a case that the timer T312 runs, the timer T312 is stopped
  (C) In a case that the timer T314 runs, the timer T314 is stopped
  (D) The timer T304 is started with a value (t304) included in the mobilityControlInfo information element
  (E) In a case that information of a carrier frequency is included, the frequency is determined as a frequency of a target cell, whereas in a case that information of a carrier frequency is not included, a frequency of a source PCell is determined as a frequency of a target cell
  (F) In a case that a timer for access control runs, the timer is stopped
  (G) Synchronization with a downlink of a target cell is initiated In NR, an example of processing related to handover in the same RATs (specifically, in NRs) will be described with reference to FIG. 8. The description with reference to FIG. 8 is merely an example, and a part of processing may be omitted, and other processing may be included. Alternatively, other processing may be performed as the processing related to handover.

In FIG. 8, a handover source base station apparatus (Source gNB) configures measurement of neighboring cells for the terminal apparatus, and the terminal apparatus performs the measurement configured from the Source gNB and reports measurement results to the Source gNB (Step S801).

The Source gNB determines hand-off of the terminal apparatus, based on reported information such as the measurement results (Step S802).

The Source gNB issues a handover request message including information necessary for preparation of handover to a base station apparatus (Target gNB) being a handover target (Step S803).

Admission control may be performed in the Target gNB (Step S804).

The Target gNB performs preparation of the handover, and transmits a handover request acknowledge message (HANDOVER REQUEST ACKNOWLEDGE message) to the Source gNB (Step S805). In the handover request acknowledge message, a container transparently transmitted to the terminal apparatus is included as an RRC message for performing handover.

The Source gNB transmits a container (first RRC reconfiguration message (RRCReconfiguration message)) received from the Target gNB to the terminal apparatus (Step S806). In the RRC reconfiguration message, a part or all of an identifier of a target cell, a new C-RNTI, a security algorithm identifier of the Target gNB for selected security algorithm, a set of resources of a dedicated random access channel, configuration of a UE-specific CSI-RS, shared random access channel resources, and system information of a target cell may be included.

Note that, in a case that make-before-break handover (Make-Before-Break HO (MBB-HO)) is configured for the terminal apparatus through the first RRC reconfiguration message, the terminal apparatus may receive the first RRC reconfiguration message, and then maintain connection with the Source gNB until first uplink transmission is performed in at least the Target gNB.

The Source eNB transmits an SN STATUS TRANSFER message for Conveying a reception state of a sequence number of an uplink PDCP and a transmission state of a sequence number of a downlink PDCP to the Target gNB (Step S807).

In a case that RACH-less handover is not configured through the first RRC reconfiguration message, the terminal apparatus Performs synchronization with the Target eNB, and accesses a cell being a target by using a random access channel. In this case, in a case that a dedicated random access preamble is indicated by the first RRC reconfiguration message, a Contention-free random access procedure may be performed, whereas in a case that the dedicated random access preamble is not indicated, a Contention-based random access procedure may be performed. In a case that the RACH-less handover is configured through the first RRC reconfiguration message, the terminal apparatus performs synchronization with the Target gNB.

In a case that the RACH-less handover is not configured through the first RRC reconfiguration message, the Target gNB may return uplink allocation and information of timing advance to the terminal apparatus.

In a case that the RACH-less handover is configured through the first RRC reconfiguration message, and periodic uplink grant pre-allocation (periodic pre-allocated uplink grant) fails to be acquired through the first RRC reconfiguration message, the terminal apparatus receives the uplink grant on the PDCCH of a target cell. The terminal apparatus uses the first Available uplink grant after synchronizing with the target cell.

In a case that the RACH-less handover is not configured, and the terminal apparatus successfully accesses the target cell, the terminal apparatus may transmit an RRC reconfiguration complete message (RRCReconfigurationComplete message) to the Target gNB in order to Confirm the handover. The RRC reconfiguration complete message may indicate completion of the handover procedure of the terminal apparatus. In the RRC reconfiguration complete message, a C-RNTI may be included, and the Target gNB may Verify the C-RNTI of the received RRC reconfiguration complete message.

In a case that the RACH-less handover is configured, and the terminal apparatus receives an uplink grant, the terminal apparatus may transmit an RRC reconfiguration complete (RRCReconfigurationComplete) message to the Target gNB in order to Confirm the handover. In the RRC reconfiguration complete message, a C-RNTI may be included, and the Target gNB may Verify the C-RNTI of the received RRC reconfiguration complete message. In a case that the terminal apparatus receives a UE contention resolution identifier MAC control element (UE contention resolution identity MAC control element) from the Target gNB, the handover procedure of the terminal apparatus may complete (Step S808).

The Target eNB transmits a path switch request (PATH SWITCH REQUEST) message to an AMF in order to cause the 5GC to switch a downlink data path to the Target gNB and to establish an NG-C interface instance for the Target gNB (Step S809).

The 5GC switches the downlink data path to the Target gNB. A UPF transmits one or multiple end marker packets to the Source eNB, and releases resources of the user plane to the Source gNB (Step S810).

The AMF acknowledges the path switch request through a path switch request acknowledge (PATH SWITCH REQUEST ACKNOWLEDGE) message (Step S811).

By transmitting a UE context release (UE CONTEXT RELEASE) message to the Source eNB, the Target gNB indicates success of the handover, and triggers release of resources by the Source gNB. The Target gNB may transmit the message after receiving the path switch request acknowledge message from the AMF. Reception of the UE context release message allows the Source gNB to release radio related to the UE context and the resources related to the C plane. Ongoing data transfer may be continued (Step S812).

In a case that the timer T304 expires, the terminal apparatus performs a part or all of the processing of (A) to (D) described below.

(A) In a case that the timer T304 of the MCG expires, the configuration of a dedicated random access channel of the MCG configured through the first RRC connection reconfiguration message is released (B) In a case that the timer T304 of the MCG expires, the configuration of the terminal apparatus is brought back to the configuration used in the PCell of handover sources (D) In a case that the timer T304 of the MCG expires, the re-establishment procedure of RRC connection is initiated (E) In a case that the timer T304 of the SCG expires, the configuration of a dedicated random access channel of the SCG configured through the first RRC connection reconfiguration message is released (E) In a case that the timer T304 of the SCG expires, a procedure of reporting that reconfiguration with synchronization of the SCG has failed Details of processing of the terminal apparatus that has received the first RRC reconfiguration message will be described. In first RRC reconfiguration message, a reconfiguration with synchronization (reconfigurationWithSync) information element may be included. The reconfigurationWithSync information element may be included in the configuration of the SpCell for each cell group (the MCG and the SCG) of the RRC reconfiguration message. The reconfigurationWithSync information element includes parameters (for example, configuration of a target SpCell, a new identifier of the terminal apparatus, and the like) related to reconfiguration accompanied with synchronization with the target SpCell.

The terminal apparatus that has received the RRC reconfiguration message (first RRC reconfiguration message) including the reconfigurationWithSync information element performs a part or all of the processing of (A) to (E) described below.

(A) In a case that security is not activated, the release cause is configured to "other", and processing of exiting RRC_CONNECTED is initiated. The processing of exiting RRC_CONNECTED may be processing of entering RRC_IDLE.

(B) In a case that the timer T310 of the SpCell being a target runs, the timer T310 of the SpCell being a target is stopped (C) The timer T304 of the SpCell being a target is started with a value (t304) included in the reconfigurationWithSync information element (D) In a case that information of a downlink frequency is included, the frequency is determined as a frequency of the SSB of a target cell, whereas in a case that information of a downlink frequency is not included, a frequency of the SSB of a source SpCell is determined as a frequency of the SSB of a target cell (E) Synchronization with a downlink of a target cell is initiated As described above, in EUTRA and NR, in a case that the make-before-break handover (Make-Before-Break HO (MBB-HO)) is configured for the terminal apparatus, the terminal apparatus maintains connection with the Source eNB or the Source gNB until the first uplink transmission is performed in the Target eNB or the Target gNB. In the present circumstances, the timer T310 is stopped in a case that the first RRC connection reconfiguration message or the first RRC reconfiguration message is received. Thus, the terminal apparatus is unable to determine whether or not the situation is a situation considered to be a radio link failure caused due to a physical layer problem in the serving cell (source cell) of the Source eNB or the Source gNB after the reception. In a case that the timer T304 runs, the terminal apparatus is unable to determine whether or not the situation is a situation considered to be a radio link failure caused due to a problem of random access indicated from the MAC layer in the serving cell (source cell) of the Source eNB or the Source gNB. In a case that retransmission in the RLC reaches a maximum number of times in the source cell, this is considered to be a radio link failure, and the re-establishment procedure of RRC connection is performed.

Based on the description in the above, various embodiments of the present invention will be described. Note that each processing described in the above may be applied to each processing omitted in the description below.

The following will describe an example of efficiently performing the MBB-HO by changing the procedure related to radio link monitoring in the MBB-HO.

First, in a case that the RRC layer processing unit of the UE 122 receives consecutive out of synchronization indicated from the physical layer processing unit a predetermined number of times (N310 times), the RRC layer processing unit may Start or Restart the timer (T310), regardless of whether or not the timer T304 runs under a specific condition (first condition) in the primary cell (PCell) being the SpCell of the MCG. In a case that the RRC layer processing unit of the UE 122 receives consecutive in synchronization a predetermined number of times (N311 times), the RRC layer processing unit may Stop the timer (T310). In determination of starting or restarting the timer T310, a condition that none of the timer T300, the timer T301, and the timer T311 runs may be added to a condition.

In a case that any one of the conditions of (A) to (E) described below is satisfied, the RRC layer processing unit of the UE 122 determines that a radio link failure is detected in the MCG.

(A) A case that the timer T310 Expires
(B) A case that the timer T312 expires
(C) A case that an indication of a random access problem is received from a MAC entity of the MCG while none of the timer T300, the timer T301, the timer T304, and the timer T311 runs
(D) A case that an indication of a random access problem is received from a MAC entity of the MCG while the timer T304 runs under the first condition
(E) A case that an indication indicating that retransmission of the SRB or the DRB has reached a maximum number of times of retransmission is received from an RLC layer of the MCG The first condition may be a state in which makeBeforeBreak-r16 is configured for the UE 122. In a case of EUTRA, the state in which makeBeforeBreak-r16 is configured may be, for example, a state in which the UE 122 receives the RRC connection reconfiguration message in which makeBeforeBreak-r16 is included in a field of the mobilityControlInfo information element. In a case of NR, the state in which makeBeforeBreak-r16 is configured may be, for example, a state in which the RRC reconfiguration message in which makeBeforeBreak-r16 is included in a field of the reconfiguration with synchronization information element is received. In a case of EUTRA, a state in which makeBeforeBreak-r16 is not configured may be, for example, a state in which the UE 122 receives the RRC connection reconfiguration message in which makeBeforeBreak-r16 is not included in a field of the mobilityControlInfo information element. In a case of EUTRA, the state in which makeBeforeBreak-r16 is not configured may be, for example, a state in which the UE 122 receives the RRC connection reconfiguration message including makeBeforeBreak-r16 having False as a value. In a case of NR, the state in which makeBeforeBreak-r16 is not configured may be, for example, a state in which the RRC reconfiguration message in which makeBeforeBreak-r16 is not included in a field of the reconfiguration with synchronization information element is received.

For example, makeBeforeBreak-r16 may have values of an enumerated type including true, or may have information elements including information necessary for the make-before-break handover as values.

Condition (E) in the above may be (E2) described below.

(E2) A case that an indication indicating that retransmission of the SRB or the DRB has reached a maximum number of times of retransmission is received from an RLC layer of the MCG while none of the timer T300, the timer T301, the timer T304, and the timer T311 runs, or a case that an indication indicating that retransmission of the SRB or the DRB has reached a maximum number of times of retransmission is received from an RLC layer of the MCG while the timer T304 runs under the first condition In a case that the UE 122 determines that a radio link failure is detected in the MCG, the UE 122 Stores various pieces of information as radio link failure information. Then, in a case that security of AS is not Activated, the release cause may be configured to "other", and processing of exiting RRC_CONNECTED may be initiated.

In a case that AS security is activated and the present condition is the first condition, transmission of a part or all of the SRB and/or the DRB of the MCG is Suspended, and a MAC entity of the MCG may be reset.

In a case that AS security is activated and the present condition is not the first condition, the procedure of RRC connection re-establishment may be initiated.

The re-establishment procedure of RRC connection may be initiated in a case that any one of the conditions of (A) to (E) described below is met.

(A) A case that a radio link failure of the MCG is detected while the present condition is not the first condition
(B) A case that handover fails (in NR, reconfiguration with synchronization in the MCG fails)
(C) A case that mobility to another RAT fails
(D) A case that a failure of a check on integrity (Integrity check) related to SRB 1 or SRB 2 is indicated from a lower layer
(E) A case that reconfiguration of RRC connection fails In a case that any one of the conditions in the above is met, the present condition is the first condition, and a radio link failure is not detected in the MCG of a handover source, a procedure of indicating a handover failure in the MCG of the handover source may be initiated without initiating the re-establishment procedure of RRC connection.

In a case that the first condition is a condition that makeBeforeBreak-r16 is configured for the UE 122, configured makeBeforeBreak-r16 may be released in a case that the timer T304 expires or the procedure of indicating a handover failure in the MCG of the handover source is initiated.

In a case that the re-establishment procedure of RRC connection is initiated, the UE 122 performs a part or all of the processing of (A) to (J) described below.

(A) In a case that the timer T310 runs, the timer T310 is stopped
(B) In a case that the timer T312 runs, the timer T312 is stopped (C) In a case that the timer T313 runs, the timer T313 is stopped (C) In a case that the timer T314 runs, the timer T314 is stopped (D) The timer T311 is started (E) All of the RBs other than SRB 0 are Suspended (F) The MAC is reset (G) In a case that the SCell of the MCG is configured, the SCell is released (H) Default physical channel configuration is applied (I) Default MAC main configuration is applied to the MCG (J) A cell selection procedure is performed Next, the following case has been under study: in processing of handover, the UE 122 transmits the RRC connection reconfiguration complete message or the RRC reconfiguration complete message to a target cell, and subsequently performs data transmission and/or reception through both of the cell groups of an MCG after the handover (also referred to as a Target MCG or the Current MCG) and a handover Source MCG (Source MCG) (case of operation in a Dual protocol stack). An example of the processing in this case will be described. Note that the following processing is not limited to the case of the Dual protocol stack, and can be applied to other cases as well.

First, in a case that the RRC layer processing unit of the UE 122 receives consecutive out of synchronization indicated from the physical layer processing unit of the Source MCG a predetermined number of times (N310 times), the RRC layer processing unit may Start or Restart the timer (T310) of the Source MCG, regardless of whether or not the timer T304 of the Source MCG runs under a specific condition (first condition) in the primary cell being the SpCell of the Source MCG. In a case that the RRC layer processing unit of the UE 122 receives consecutive in synchronization from the physical layer processing unit of the Source MCG a predetermined number of times (N311 times), the RRC layer processing unit may Stop the timer (T310). In determination of starting or restarting the timer T310, a condition that none of the timer T300 of the Source MCG, the timer T301 of the Source MCG, and the timer T311 of the Source MCG runs may be added to a condition.

In a case that any one of the conditions of (A) to (E) described below is satisfied, the RRC layer processing unit of the UE 122 determines that a radio link failure is detected in the Source MCG.

(A) A case that the timer T310 of the Source MCG Expires (B) A case that the timer T312 of the Source MCG expires (C) A case that an indication of a random access problem is received from a MAC entity of the Source MCG while none of the timer T300, the timer T301, the timer T304, and the timer T311 of the Source MCG runs (D) A case that an indication of a random access problem is received from a MAC entity of the Source MCG while the timer T304 of the Source MCG runs under the first condition (E) A case that an indication indicating that retransmission of the SRB or the DRB has reached a maximum number of times of retransmission is received from an RLC layer of the Source MCG The first condition may be a state in which makeBeforeBreak-r16 is configured for the UE 122.

The first condition may be a state in which any one of makeBeforeBreak-r14 and makeBeforeBreak-r16 is configured for the UE 122.

Condition (E) in the above may be (E2) described below.

(E2) A case that an indication indicating that retransmission of the SRB or the DRB has reached a maximum number of times of retransmission is received from an RLC layer of the Source MCG while none of the timer T300, the timer T301, the timer T304, and the timer T311 of the Source MCG runs, or a case that an indication indicating that retransmission of the SRB or the DRB has reached a maximum number of times of retransmission is received from an RLC layer of the Source MCG while the timer T304 runs under the first condition In a case that the UE 122 determines that a radio link failure is detected in the Source MCG, the UE 122 may Suspend transmission of a part or all of the SRB and/or the DRB of the Source MCG, and reset a MAC entity of the Source MCG.

In a case that makeBeforeBreak-r16 is configured in the Current MCG, the UE 122 may consider the MCG to be the Source MCG.

In a case that the UE 122 is allocated a first uplink grant on the PDCCH in a cell of a handover target, the UE 122 may consider the MCG of the handover source to be the Source MCG.

In a case that the UE 122 transmits the RRC reconfiguration complete message, the UE 122 may consider the MCG of the handover source to be the Source MCG.

In a case that the UE 122 receives a UE contention resolution identifier MAC control element (UE contention resolution identity MAC control element) from the Target gNB, the UE 122 may consider the MCG of the handover source to be the Source MCG.

In a case that makeBeforeBreak-r16 is configured for the UE 122 in the Current MCG and the Source MCG is already present, the UE 122 may release the MCG, and consider the Current MCG to be a new Source MCG.

As described above, through identification of the processing of detection of a radio link failure of the Source MCG and the processing of detection of a radio link failure in the Current MCG, unnecessary re-establishment processing in the MBB-HO can be prevented, and efficient mobility can thus be implemented.

FIG. 10 is an example of ASN.1 description illustrating the RRC connection reconfiguration message of EUTRA of FIG. 4. FIG. 11 is another example of ASN.1 description illustrating the RRC connection reconfiguration message of EUTRA of FIG. 4. FIG. 12 is an example of ASN.1 description illustrating the RRC reconfiguration message of NR of FIG. 4. FIG. 13 is another example of ASN.1 description illustrating the RRC reconfiguration message of NR of FIG. 4. In the examples of ASN.1 of FIG. 10 to FIG. 13, <omitted> and <partly omitted> are not a part of the description of ASN.1, but indicate that other information is omitted. Note that information elements may be omitted at parts in which the description of <omitted> or <partly omitted> is absent. Note that the examples of ASN.1 in FIG. 10 to FIG. 13 do not correctly follow the ASN.1 description method, but describe examples of parameters of the RRC reconfiguration according to the present invention, and other terms and other description may be used. Further, the examples of ASN.1 in FIG. 10 to FIG. 13 illustrate only the examples related to main information that is closely related to an aspect of the present invention, for the sake of avoiding complexity of description. Note that the parameters described with ASN.1 may all be referred to as information elements, instead of making distinction between fields, information elements, and the like. Further, in the embodiments of the present invention, the parameters such as the fields and the information elements that are included in the RRC message and are described with ASN.1 may be referred to as information.

The information element represented by mobilityControlInfo in FIG. 10 and FIG. 11 is an information element including a parameter related to mobility to EUTRA of network control. In the information element represented by mobilityControlInfo, a part or all of the pieces of information of (A) to (H) described below may be included.

(A) A target physical cell identifier
(B) 304 indicating information of a time period from the start to expiration of the timer T304
(C) newUE-Identity indicating a new identifier (C-RNTI) of the UE 122
(D) Radio resource configuration
(E) Configuration of a dedicated random access channel
(F) makeBeforeBreak-r14 being a parameter for configuring existing make-before-break handover (according to Release 14)
(G) rach-Skip-r14 being a parameter for configuring RACH-less handover
(H) makeBeforeBreak-r16 being a parameter for configuring make-before-break handover according to the present embodiment FIG. 10 illustrates an example in which makeBeforeBreak-r16 is of an enumerated type, and FIG. 11 illustrates an example in which MakeBeforeBreak-r16 having an information element of makeBeforeBreak-r16 is included as a value, and MakeBeforeBreak-r16 being an information element includes multiple fields.

In FIG. 12 and FIG. 13, an information element represented by the reconfiguration with synchronization is, for example, an information element including a parameter related to handover of the PCell and addition and change of the PSCell. In the information element represented by the reconfiguration with synchronization, a part or all of the pieces of information of (A) to (F) described below may be included.

(A) Configuration of the SpCell
(B) t304 indicating information of a time period from the start to expiration of the timer T304
(C) newUE-Identity indicating a new identifier (RNTI) of the UE 122
(D) Configuration of a dedicated random access channel
(E) makeBeforeBreak-r16 being a parameter for configuring make-before-break handover according to the present embodiment
(F) rach-Skip-r16 being a parameter for configuring RACH-less handover FIG. 12 illustrates an example in which makeBeforeBreak-r16 is of an enumerated type, and FIG. 13 illustrates an example in which MakeBeforeBreak-r16 having an information element of makeBeforeBreak-r16 is included as a value, and MakeBeforeBreak-r16 being an information element includes multiple fields.

A part or all of the fields illustrated in FIG. 10 to FIG. 13 may be optional. Specifically, the fields illustrated in FIG. 10 to FIG. 13 may be included in a message according to a condition.

Figure 5:
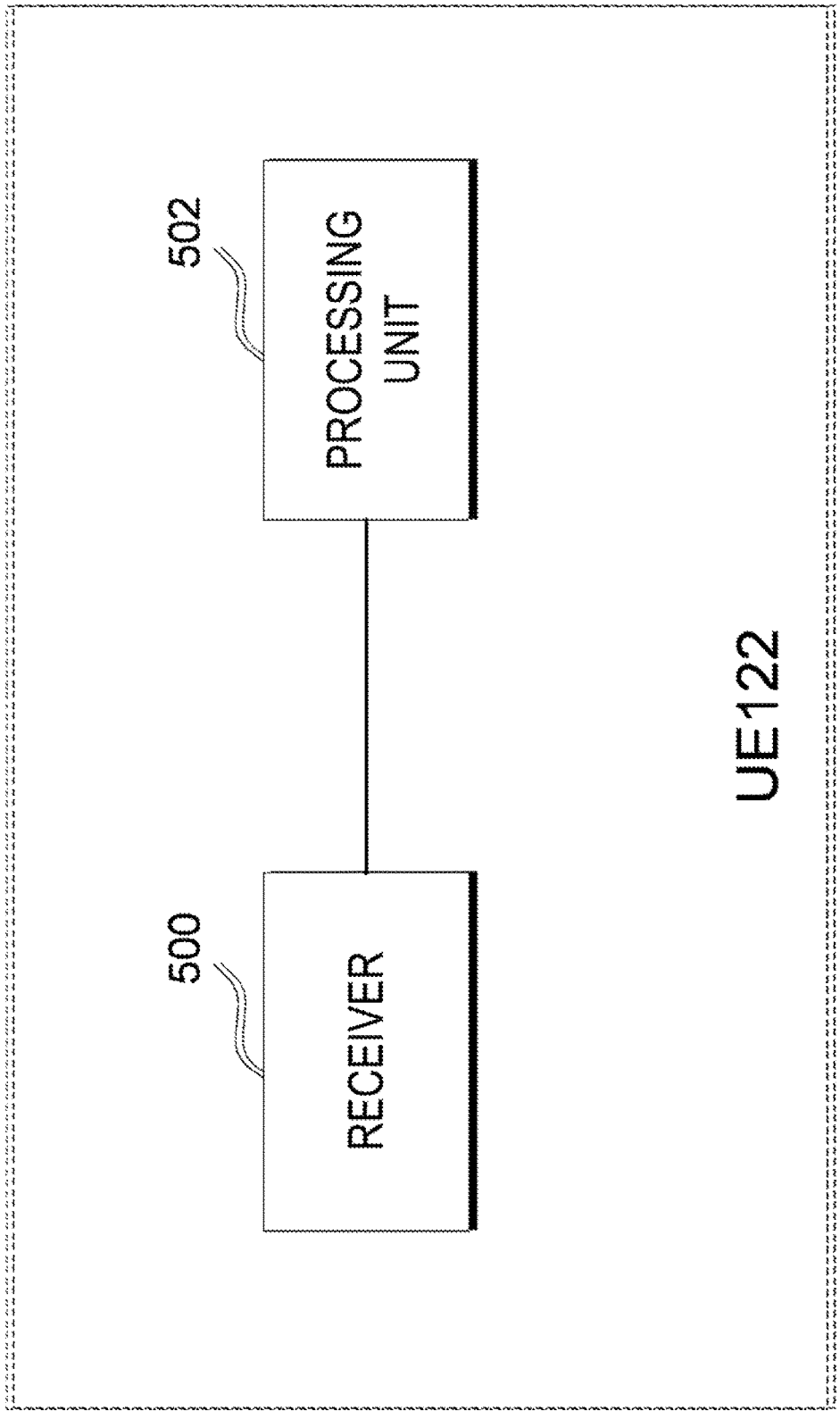
FIG. 5 is a block diagram illustrating a configuration of the terminal apparatus according to each embodiment of the present invention.

FIG. 5 is a block diagram illustrating a configuration of the terminal apparatus (UE 122) according to each embodiment of the present invention. Note that, for the sake of avoiding complexity of description, in FIG. 5, only main constituent parts that are closely related to an aspect of the present invention are illustrated.

The UE 122 illustrated in FIG. 5 includes a receiver 500 that receives an RRC message and the like from the base station apparatus, and a processing unit 502 that performs processing according to any one or all of pieces of configuration information such as various Information Elements (IEs) included in a received message, various fields, and various conditions. The base station apparatus described above may be the eNB 102, or may be the gNB 108. In the processing unit 502, a part or all of the functions of various layers (for example, the physical layer, the MAC layer, the RLC layer, the PDCP layer, the RRC layer, and the NAS layer) may be included. Specifically, in the processing unit 502, a part or all of a physical layer processing unit, a MAC layer processing unit, an RLC layer processing unit, a PDCP layer processing unit, an RRC layer processing unit, and a NAS layer processing unit may be included.

Figure 6:
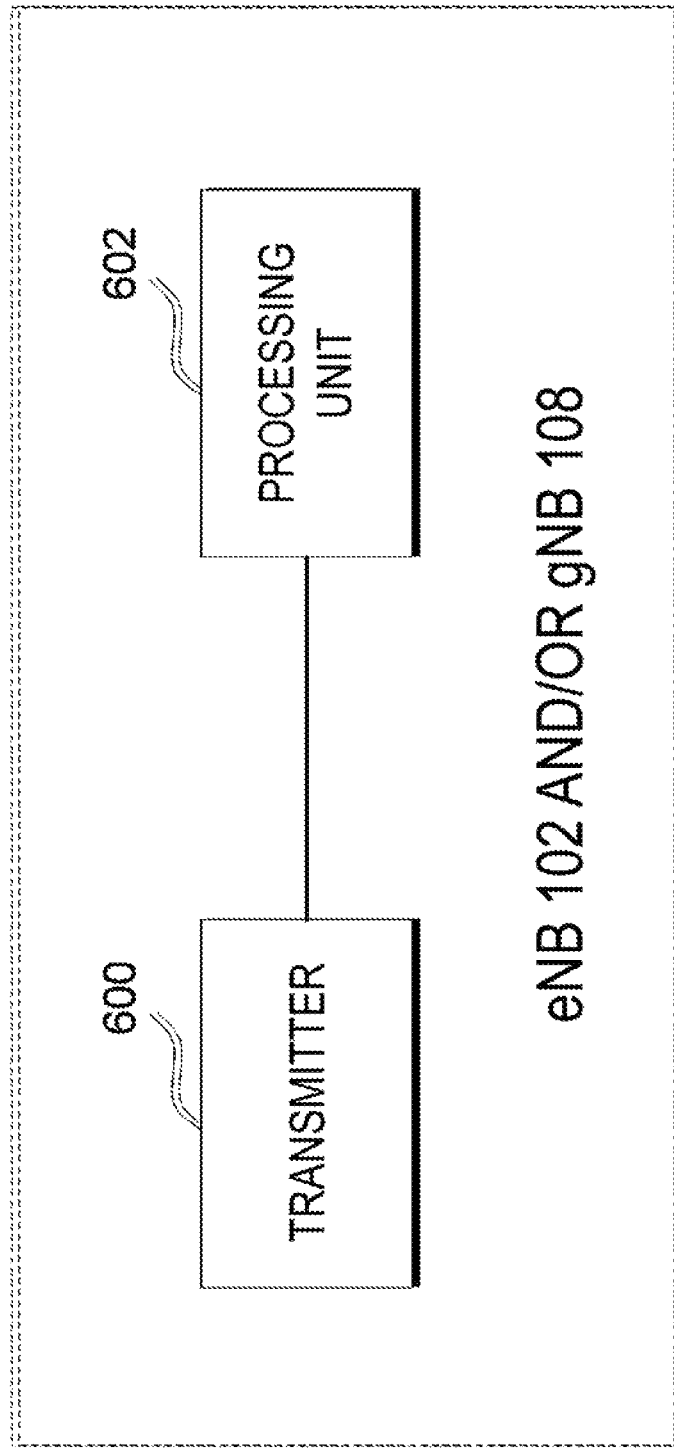
FIG. 6 is a block diagram illustrating a configuration of the base station apparatus according to each embodiment of the present invention.

FIG. 6 is a block diagram illustrating a configuration of the base station apparatus according to each embodiment of the present invention. Note that, for the sake of avoiding complexity of description, in FIG. 6, only main constituent parts that are closely related to an aspect of the present invention are illustrated. The base station apparatus described above may be the eNB 102, or may be the gNB 108.

The base station apparatus illustrated in FIG. 6 includes a transmitter 600 that transmits an RRC message and the like to the UE 122, and a processing unit 602 that creates an RRC message including any one or all of pieces of configuration information such as various Information Elements (IEs), and various fields, and various conditions and transmits the RRC message to the UE 122 to thereby cause the processing unit 502 of the UE 122 to perform processing. In the processing unit 602, a part or all of the functions of various layers (for example, the physical layer, the MAC layer, the RLC layer, the PDCP layer, the RRC layer, and the NAS layer) may be included. Specifically, in the processing unit 602, a part or all of a physical layer processing unit, a MAC layer processing unit, an RLC layer processing unit, a PDCP layer processing unit, an RRC layer processing unit, and a NAS layer processing unit may be included.

In this manner, according to the embodiments of the present invention, efficient communication can be performed in a case of handover of the UE 122.

Hereinafter, various aspects of the terminal apparatus and the base station apparatus according to the embodiments of the present invention will be described.

(1) A first embodiment aspect of the present invention is a terminal apparatus for communicating with a base station apparatus through a group (master cell group (MCG)) including at least one or more cells. The terminal apparatus includes: a receiver configured to receive an RRC message from the base station apparatus; and a processing unit configured to perform processing of RRC. The processing unit causes, in a case that first information is included in the RRC message, a first timer to start to be in a running state, and considers, at least in a case that a random access problem indication is received from a MAC entity of the MCG of the terminal apparatus in a state in which the first timer is not running, or in a case that a random access problem indication is received from a MAC entity of the MCG of the terminal apparatus in a state in which the first timer is running under a specific condition, a radio link failure for the MCG to be detected. In a case that the radio link failure for the MCG is considered to be detected and that the first timer is running under the specific condition, the processing unit suspends transmission of all of radio bearers in the MCG, and resets the MAC entity of the MCG.

(2) A second embodiment aspect of the present invention is a terminal apparatus for communicating with a base station apparatus through a group (master cell group (MCG)) including at least one or more cells. The terminal apparatus includes: a receiver configured to receive an RRC message from the base station apparatus; and a processing unit configured to perform processing of RRC. The processing unit causes, in a case that first information is included in the RRC message, a first timer to start to be in a running state, causes, at least in a case that a first indication is consecutively received a predetermined number of times from a PHY entity of the MCG in a state in which the first timer is not running, or in a case that the first indication is consecutively received a predetermined number of times from a PHY entity of the MCG regardless of whether or not the first timer is running under a specific condition, a second timer to start to be in a running state, and considers, in a case that the second timer expires, a radio link failure for the MCG to be detected.

(3) A third embodiment aspect of the present invention is a method applied to a terminal apparatus for communicating with a base station apparatus through a group (master cell group (MCG)) including at least one or more cells. The method at least includes the steps of: receiving an RRC message from the base station apparatus; and performing processing of RRC. In a case that first information is included in the RRC message, a first timer is caused to start to be in a running state. At least in a case that a random access problem indication is received from a MAC entity of the MCG of the terminal apparatus in a state in which the first timer is not running, or in a case that a random access problem indication is received from a MAC entity of the MCG of the terminal apparatus in a state in which the first timer is running under a specific condition, a radio link failure for the MCG is considered to be detected. In a case that the radio link failure for the MCG is considered to be detected and that the first timer is running under the specific condition, transmission of all of radio bearers in the MCG is suspended, and the MAC entity of the MCG is reset.

(4) A second embodiment aspect of the present invention is a method applied to a terminal apparatus for communicating with a base station apparatus through a group (master cell group (MCG)) including at least one or more cells. The method includes the steps of: receiving an RRC message from the base station apparatus; and performing processing of RRC. In a case that first information is included in the RRC message, a first timer is caused to start to be in a running state. At least in a case that a first indication is consecutively received a predetermined number of times from a PHY entity of the MCG in a state in which the first timer is not running, or in a case that the first indication is consecutively received a predetermined number of times from a PHY entity of the MCG regardless of whether or not the first timer is running under a specific condition, a second timer is caused to start to be in a running state. In a case that the second timer expires, a radio link failure for the MCG is considered to be detected.

(5) A fifth embodiment aspect of the present invention is an integrated circuit implemented in a terminal apparatus for communicating with a base station apparatus through a group (master cell group (MCG)) including at least one or more cells. The integrated circuit is configured to cause the terminal apparatus to exert: a function of receiving an RRC message from the base station apparatus; and a function of performing processing of RRC. In a case that first information is included in the RRC message, a first timer is caused to start to be in a running state. At least in a case that a random access problem indication is received from a MAC entity of the MCG of the terminal apparatus in a state in which the first timer is not running, or in a case that a random access problem indication is received from a MAC entity of the MCG of the terminal apparatus in a state in which the first timer is running under a specific condition, a radio link failure for the MCG is considered to be detected. In a case that the radio link failure for the MCG is considered to be detected and that the first timer is running under the specific condition, transmission of all of radio bearers in the MCG is suspended, and the MAC entity of the MCG is reset.

(6) A sixth embodiment aspect of the present invention is an integrated circuit implemented in a terminal apparatus for communicating with a base station apparatus through a group (master cell group (MCG)) including at least one or more cells. The integrated circuit causes the terminal apparatus to perform: receiving an RRC message from the base station apparatus; and performing processing of RRC. In a case that first information is included in the RRC message, a first timer is caused to start to be in a running state. At least in a case that a first indication is consecutively received a predetermined number of times from a PHY entity of the MCG in a state in which the first timer is not running, or in a case that the first indication is consecutively received a predetermined number of times from a PHY entity of the MCG regardless of whether or not the first timer is running under a specific condition, a second timer is caused to start to be in a running state. In a case that the second timer expires, a radio link failure for the MCG is considered to be detected.

(7) A seventh embodiment aspect of the present invention is a terminal apparatus for communicating with a base station apparatus through a group (master cell group (MCG)) including at least one or more cells. The terminal apparatus includes: a receiver configured to receive an RRC message from the base station apparatus; and a processing unit configured to periodically receive any one of in synchronization (in-sync) (first indication) and out of synchronization (out-of-sync) (second indication) from a PHY entity of the MCG, receive indication (third indication) of a random access problem for an uplink to the base station apparatus from a MAC entity of the MCG, and receive indication (fourth indication) that the number of times of retransmission of an automatic repeat request (ARQ) for the base station apparatus has reached a maximum number of times from an RLC entity of the MCG. In a case that first information (mobilityControlInfo in EUTRA, or reconfiguration with synchronization in NR) is included in the RRC message, the processing unit causes a first timer (timer T304) to start to be in a running state. In a case that a message for requesting RRC connection is transmitted to the base station apparatus, the processing unit causes a second timer (T300) to start to be in a running state. In a case that a message for requesting re-establishment of RRC connection is transmitted to the base station apparatus, the processing unit causes a third timer (timer T301) to start to be in a running state. In a case that the processing unit initiates re-establishment processing of RRC connection for the base station apparatus, the processing unit causes a fourth timer (timer T311) to start to be in a running state. In a case that the processing unit consecutively receives the second indication a predetermined number of times in a state in which the first timer, the second timer, the third timer, and the fourth timer are not running, or in a case that the processing unit consecutively receives the second indication a predetermined number of times in a state in which the second timer, the third timer, and the fourth timer are not running under a first condition, the processing unit causes a fifth timer (timer T310) to start to be in a running state. In a case that the processing unit consecutively receives the first indication a predetermined number of times, and the fifth timer (timer T310) is running, the processing unit stops the fifth timer to cause the fifth timer to be in a not running state. At least in a case that the fifth timer continues to run for a predetermined time period (expires), or the processing unit receives the third indication in a state in which the first timer, the second timer, the third timer, and the fourth timer are not running, or the processing unit receives the third indication in a state in which the first timer is running under the first condition, the processing unit considers a radio link failure for the MCG to be detected. In a case that the radio link failure for the MCG is considered to be detected and that the first timer is running under the first condition, the RRC processing unit suspends transmission of all of radio bearers in the MCG, and resets the MAC entity of the MCG.

(8) An eighth embodiment aspect of the present invention is a terminal apparatus for communicating with a base station apparatus through a group (master cell group (MCG)) including at least one or more cells. The terminal apparatus includes: a receiver configured to receive an RRC message from the base station apparatus; and a processing unit configured to periodically receive any one of in synchronization (in-sync) (first indication) and out of synchronization (out-of-sync) (second indication) from a PHY entity of the MCG, receive indication (third indication) of a random access problem for an uplink to the base station apparatus from a MAC entity of the MCG, and receive indication (fourth indication) that the number of times of retransmission of an automatic repeat request (ARQ) for the base station apparatus has reached a maximum number of times from an RLC entity of the MCG. In a case that first information (mobilityControlInfo in EUTRA, or reconfiguration with synchronization in NR) is included in the RRC message, the processing unit causes a first timer (timer T304) to start to be in a running state. In a case that a message for requesting RRC connection is transmitted to the base station apparatus, the processing unit causes a second timer (T300) to start to be in a running state. In a case that a message for requesting re-establishment of RRC connection is transmitted to the base station apparatus, the processing unit causes a third timer (timer T301) to start to be in a running state. In a case that the processing unit initiates re-establishment processing of RRC connection for the base station apparatus, the processing unit causes a fourth timer (timer T311) to start to be in a running state. In a case that the processing unit consecutively receives the second indication a predetermined number of times in a state in which the second timer, the third timer, and the fourth timer are not running under a first condition, the processing unit causes a fifth timer (timer T310) to start to be in a running state.

(9) A ninth embodiment aspect of the present invention is a terminal apparatus for communicating with a base station apparatus through a group (master cell group (MCG)) including at least one or more cells. The terminal apparatus includes: a receiver configured to receive an RRC message from the base station apparatus; and a processing unit configured to process the RRC message. In a case that first information (mobilityControlInfo in EUTRA, or reconfiguration with synchronization in NR) is included in the RRC message, the processing unit causes a first timer (timer T304) to start to be in a running state. In a case that a radio link failure for the MCG is considered to be detected and that the first timer is running under the first condition, the processing unit suspends transmission of all of radio bearers in the MCG, and resets the MAC entity of the MCG.

In each of the aspects, the first condition is a condition that second information (makebeforebreak-r16) is included in the RRC message.

In each of the aspects, in a case that the first timer is not running or the present condition is not the first condition in a case that the RRC processing unit determines that the RRC processing unit has detected the radio link failure for the MCG, the RRC processing unit initiates the re-establishment processing of RRC connection.

A program operating on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, in the present invention, various modifications are possible within the scope of claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

The invention claimed is:

1. A terminal apparatus for communicating with a base station apparatus through a cell group including one or more cells, the terminal apparatus comprising:
   reception circuitry configured to receive a Radio Resource Control (RRC) message from the base station apparatus; and
   processing circuitry configured to perform processing based on the RRC message, wherein the processing circuitry is configured to:
      determine that a first parameter is configured to the terminal apparatus in a case that the first parameter is included in the RRC message, the first parameter being used for determining a radio link failure,
      in a case of not running a first timer, start a second timer based on receiving consecutive out of synchronization indications from a physical layer for a predetermined number of times,
      in a case of running the first timer, start the second timer based on configuring the first parameter and receiving the consecutive out of synchronization indications from the physical layer for the predetermined number of times, and
      consider the radio link failure is detected in a Master Cell Group (MCG) based on an expiry of the second timer, wherein
      the first timer is started based on the reconfiguration with synchronization information element being included in the RRC message.

2. The terminal apparatus according to claim 1, wherein the processing circuitry is further configured to consider the radio link failure is detected based on not running the first timer and receiving an indication of a random access problem from a Medium Access Control (MAC) entity of the MCG, and the processing circuitry is further configured to consider the radio link failure is detected based on running the first timer, configuring the first parameter, and receiving the indication of the random access problem from the MAC entity of the MCG.

3. A method applied to a terminal apparatus for communicating with a base station apparatus through a cell group including one or more cells, the method comprising:
   receiving a Radio Resource Control (RRC) message from the base station apparatus; and
   performing processing based on the RRC message, the processing comprising:
      determining that a first parameter is configured to the terminal apparatus in a case that the first parameter is included in the RRC message, the first parameter being used for determining a radio link failure,
      in a case of not running a first timer, starting a second timer based on not running the first timer and receiving consecutive out of synchronization indications from a physical layer for a predetermined number of times,
      in a case of running the first timer, starting the second timer based on configuring the first parameter and receiving the consecutive out of synchronization indications from the physical layer for the predetermined number of times, and
      considering the radio link failure is detected in a Master Cell Group (MCG) based on an expiry of the second timer, wherein
      the first timer is started based on that the reconfiguration with synchronization information element is included in the RRC message.

4. An integrated circuit implemented in a terminal apparatus for communicating with a base station apparatus through a cell group including one or more cells, the integrated circuit causing the terminal apparatus to:
   receive a Radio Resource Control (RRC) message from the base station apparatus; and
   perform processing based on the RRC message, the processing comprising:
      determining that a first parameter is configured to the terminal apparatus in a case that the first parameter is included in the RRC message, the first parameter being used for determining a radio link failure,
      in a case of not running a first timer, starting a second timer based on not running the first timer and receiving consecutive out of synchronization indications from a physical layer for a predetermined number of times,
      in a case of running the first timer, starting the second timer based on configuring the first parameter and receiving the consecutive out of synchronization indications from the physical layer for the predetermined number of times, and
      considering the radio link failure is detected in a Master Cell Group (MCG) based on an expiry of the second timer, wherein
      the first timer is started based on that the reconfiguration with synchronization information element is included in the RRC message.

* * * * *